July 30, 1963 H. E. MALMSTROM ETAL 3,099,543
ROTARY PRESSURE VESSEL
Filed Dec. 9, 1955 10 Sheets-Sheet 1
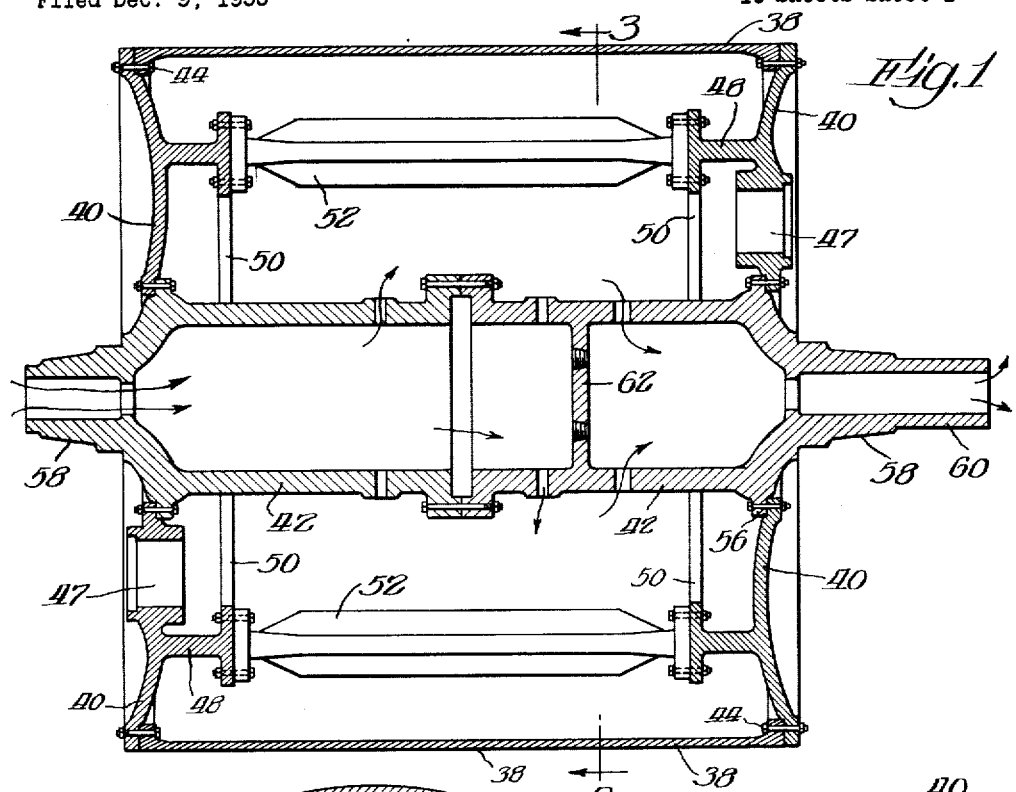
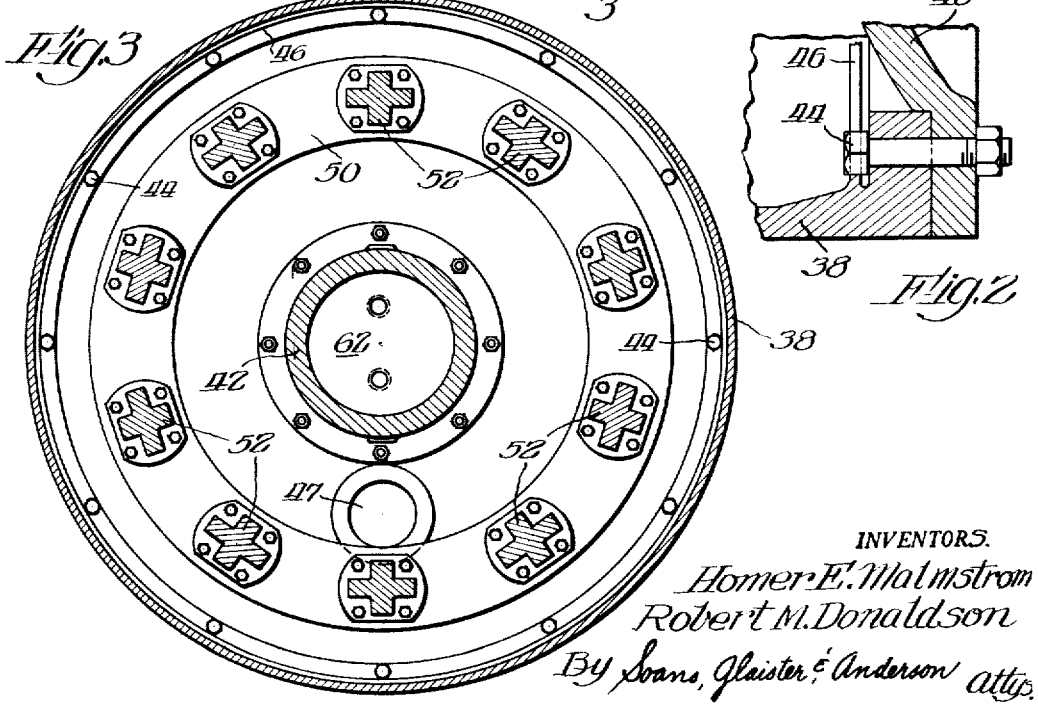
INVENTORS.
Homer E. Malmstrom
Robert M. Donaldson
By Soans, Glaister & Anderson attys.

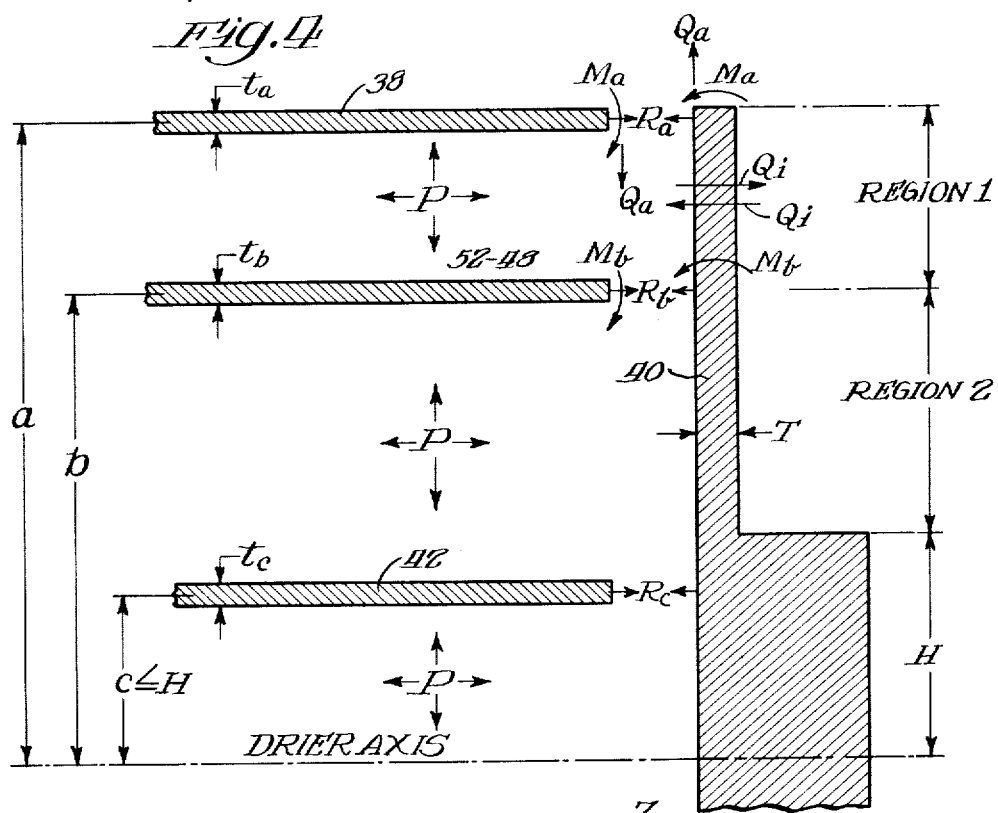
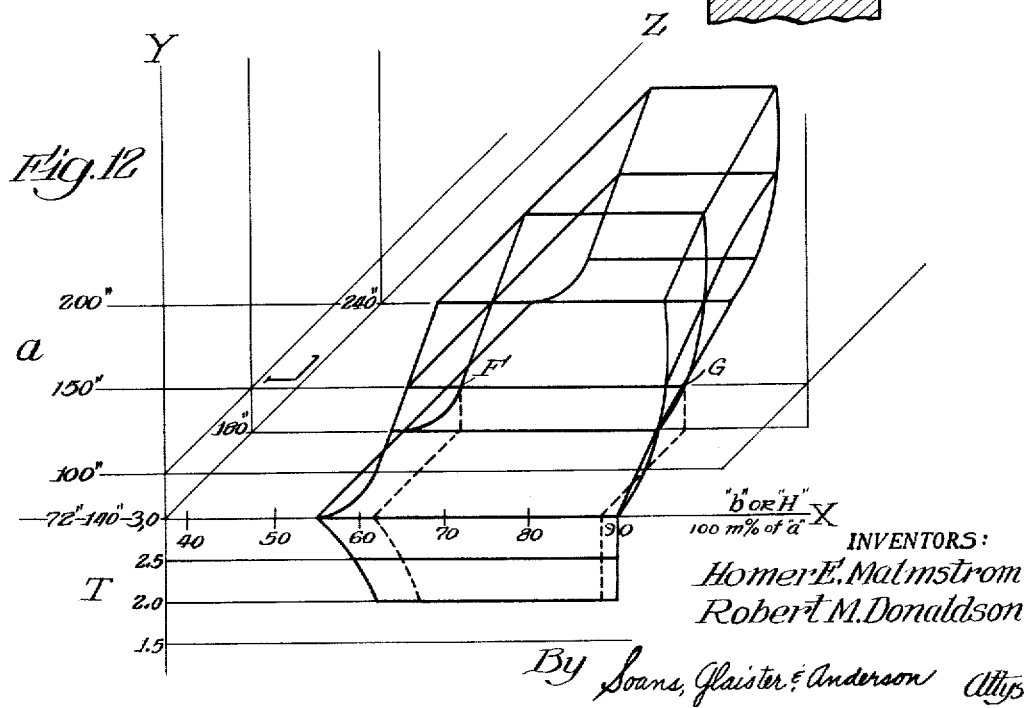

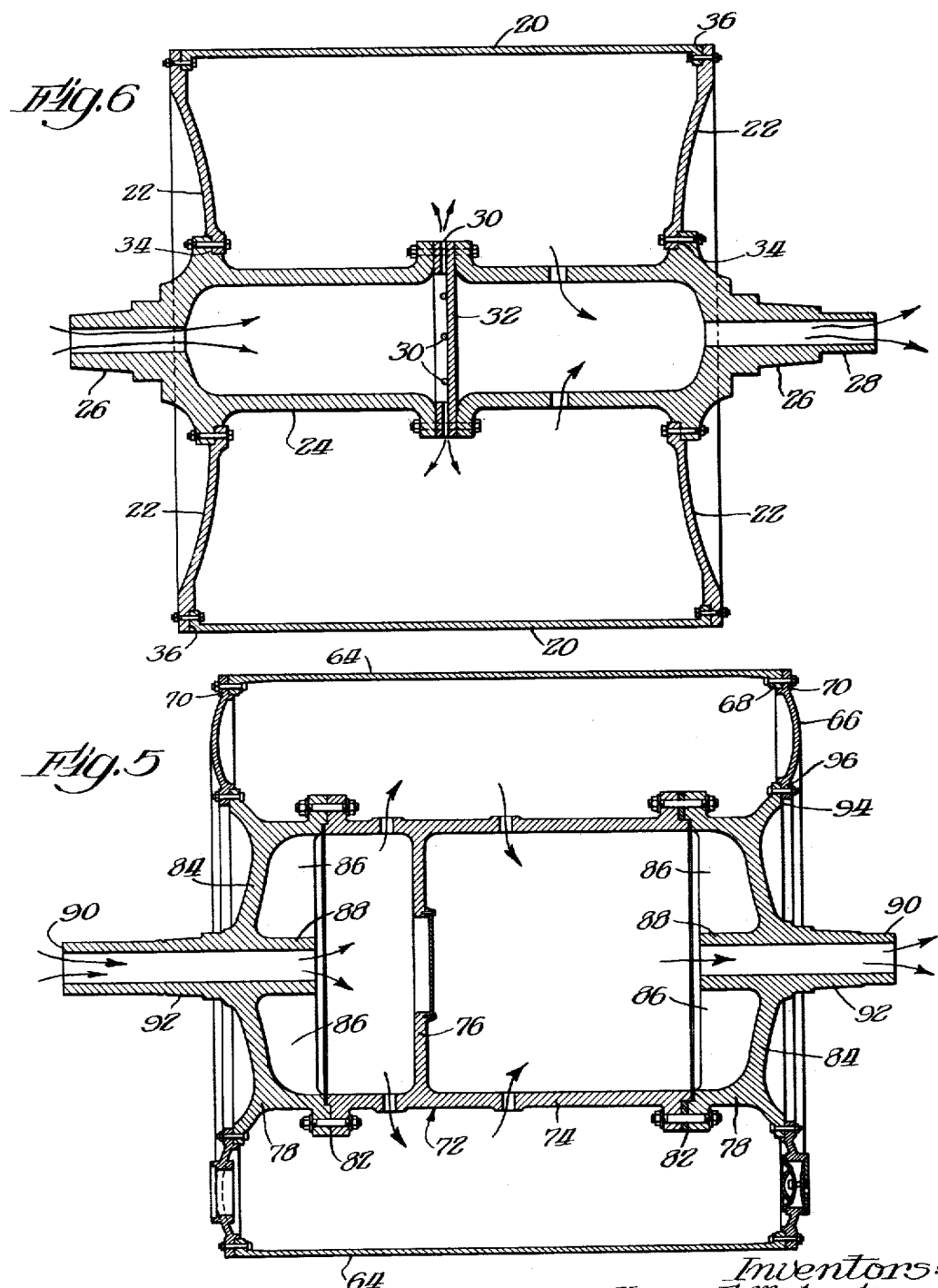

INVENTORS:
Homer E. Malmstrom
Robert M. Donaldson
By Soans, Glaister & Anderson Attys.

July 30, 1963  H. E. MALMSTROM ETAL  3,099,543
ROTARY PRESSURE VESSEL
Filed Dec. 9, 1955  10 Sheets-Sheet 9

Inventors:
Homer E. Malmstrom
Robert M. Donaldson
By Soans, Glaister & Anderson Attys

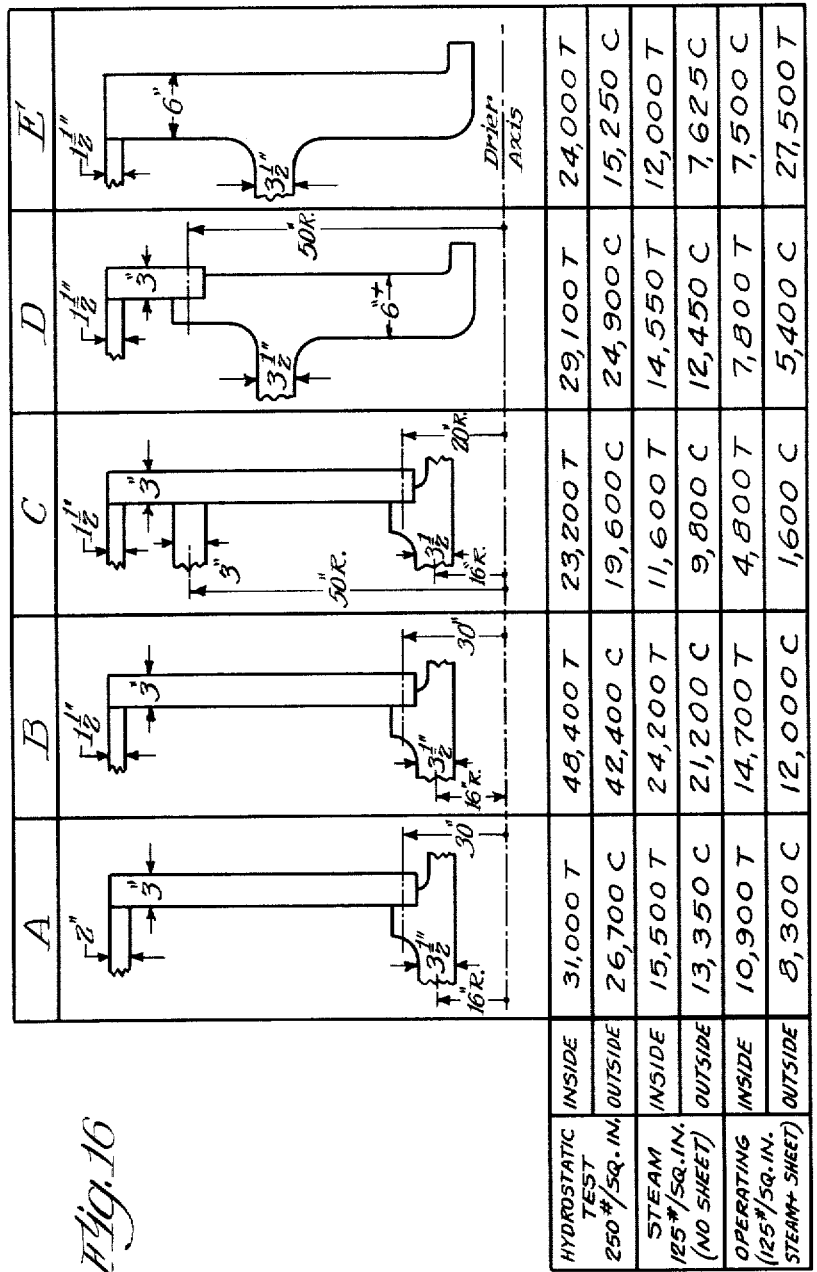

3,099,543
ROTARY PRESSURE VESSEL
Homer E. Malmstrom, Appleton, Wis., and Robert M. Donaldson, Hampton, Va., assignors to Kimberly-Clark Corporation, Neenah, Wis., a corporation of Delaware
Filed Dec. 9, 1955, Ser. No. 552,090
11 Claims. (Cl. 34—124)

This invention relates to rotary pressure vessels of the type employed in various industries as contact driers for webs, slurries, sludges, etc. The invention is particularly concerned with improvements in structural form which greatly reduce shell stresses, and therefore permit thinner shells, and higher rates of heat transfer through the shells, than have heretofore been considered practically attainable within the accepted strength limitations of the structural materials employed.

Taking the paper industry as an illustration, certain types of paper webs are made on the so-called "Yankee" paper machine, which is characterized principally by the use of a single, rotary, steam-filled drum of substantial size for the final drying of the paper web. Such machines are used for the manufacture of creped tissue, and "machine glaze" papers, so called because of the glossy surface retained on the side of the paper which was in contact with the drier surface, if the web is removed from the drier without creping. For the same reason, large driers of the Yankee type are used to produce glossy surfaces on mineral coatings applied to certain types of printing paper. In most applications, the drying loads imposed on Yankee type driers are quite high, inasmuch as the web must be dried in less than one revolution of the drier.

In the manufacture of creped tissue, for example, the paper web, when it comes to the drier, is very wet, usually having a consistency, or solids content, of only 25% to 30% by weight. It is therefore carried to the drier on a felt which is pressed onto the drier at high pressure by a pressure roll, which implants the wet web firmly on the face of the drier. The web is dried in less than one revolution of the drier, and then removed from the drier by means of a doctor blade.

In order to provide sufficient drying capacity for this kind of drying operation, modern "Yankee Driers" have become quite large, being quite commonly 12 ft. in diameter and at least as long, and are usually operated at internal steam pressures of 125 p.s.i.g. (gauge pressure pounds per square inch) and at peripheral speeds of over 2000 f.p.m. Many Yankee paper machines in operation today are operating at production limits determined by drying capacity, and various efforts have been made to increase the heating or drying capacity of the Yankee drier.

The present invention is concerned primarily with an improved form of Yankee drier having a much higher than usual drying capacity because its unique construction permits the safe use of a much thinner than usual shell. The order of magnitude of the reduction in shell thickness made possible by the invention is approximately 25%, e.g., from two inches in cast iron shells of twelve foot diameter for operation at internal steam pressures of 125 p.s.i., to approximately one and one-half inches. This will be recognized by those skilled in the art as a very substantial contribution, as indicated by the following table, which shows on a relative basis the maximum heat transmissibility through cast iron drier shells of 12 foot diameter and various thickness, operated at maximum steam pressures allowed for cast iron driers by A.S.M.E. Code for Unfired Pressure Vessels:

| Shell thickness, 12' dia. | Max. steam pressure, p.s.i., A.S.M.E. code; 60,000 p.s.i., C.I. gauge | Abs. | Steam temp. saturated, °F. | ΔT through shell; 185° F. outside | Relative rate heat flow through shell |
|---|---|---|---|---|---|
| 2.0" | 165 | 180 | 373 | 188 | $\frac{188}{2}=94$ |
| 1.5" | 125 | 140 | 353 | 168 | $\frac{168}{1.5}=112$ |
| 1.2" | 100 | 115 | 338 | 153 | $\frac{153}{1.2}=127$ |

Apart from the increased cost of maintaining facilities for high pressure operation, it is apparent that since the increase of steam temperature with higher pressures, even with superheat, cannot balance the opposite effect upon heat transmission of the increased shell thickness required at the higher pressures, greater gains in heat transmission, and thus drying capacity, can be realized by thinner shells than by higher steam pressures. Notwithstanding the obvious benefits of thinner shells, progress in that direction has been limited by the uncertainty that thinner shells in driers of accepted commercial design could withstand the imposed loads.

Still considering cast iron drier shells as a specific example, cast iron being the most common shell material for Yankee driers, it is possible to produce on a regular commercial basis, in castings of this size, a cast iron having an ultimate tensile strength of 60,000 lbs. per square inch. The A.S.M.E. Code for Unfired Pressure Vessels, which is the standard recognized by insurance underwriters for the safe operation of driers, permits cast-iron driers to be operated at a maximum steam pressure corresponding to a calculated hoop stress in the shell of 10 percent of the ultimate strength, or maximum steam pressures of one-half the hydrostatic pressure to which the vessel was actually subjected in test, whichever is less. Thus with permissible hoop stresses of 6,000 lbs. per square inch, the shell thickness of a cast iron drier shell 12 ft. in diameter intended for operation at 125 p.s.i.g. internal steam pressure can be reduced to 1½", provided it can also withstand internal hydrostatic pressures of 250 p.s.i.g. However, none of the builders of paper machines have furnished a 12 foot diameter cast iron shell of 1½" thickness for operation at 125 p.s.i.g. steam pressure. Cast iron shells of 12 foot diameter designed for operation at pressures as high as 125 p.s.i.g. were never less than about two inches thick.

Accordingly, a test drier of accepted commercial design and 12 foot diameter, but having a shell 1½" thick and only 30 inches long, was constructed to determine by actual test what the results of the operation of a thin shell at 125 p.s.i.g. would be. In the hydrostatic test of this vessel, the shell failed at an internal hydrostatic pressure of only 205 lbs. per square inch, which, translated under the standard of the A.S.M.E. Code, would mean a maximum safe operating steam pressure of 102.5 lbs. per square inch.

Yet, at an operating steam pressure of 102.5 p.s.i.g., the maximum which could be allowed under the Code in view of the test, the hoop stress would be only 4900 p.s.i., well within the allowable 10 percent of ultimate, or 6,000 p.s.i.

The shell failed by cracking along a half-circumference at one end of the vessel, and at a point in the cross section of the shell where there was a change in the thickness of the shell section for the formation of a bolting flange by means of which the shell was secured to the head or end member of the drier. Various of the possible causes were considered, e.g., that the casting might have been faulty, that the machining or assembling may have been such as to pre-stress the shell in an undesirable manner, that the machining of the shell may have introduced a local weakness because of the character of the finish, or that the distribution of metal in the cross section of the shell may have been such as to magnify the stress at the point of failure. However after thorough examination of the fractured shell and other parts, these possibilities were rejected ultimately as unfounded. It was therefore decided to cast and machine a second shell exactly like the first, and to observe its behavior more carefully under test to see what could be learned about the development of stresses in its various parts.

The new vessel was fitted inside and out, on both the shell and the heads, with many strain gauges, and the internal hydrostatic pressure was increased in small increments until, by pre-arrangement, a strain corresponding to a stress of 24,000 lbs. per square inch was observed on one of the gauges. The pressure was then released and the results of the test analyzed. As a result of this more careful test, it was determined that the predetermined maximum stress of 24,000 lbs. per square inch was exerted longitudinally of the shell on its inside at the strain gauge nearest the head, and it was reached at an internal hydrostatic pressure of only 80 lbs. per square inch.

It was further observed that under the influence of internal pressure only, the foreshortened test shell had a smaller radius at its longitudinal center than at its ends. After due reflection, these observations were interpreted as indicating that the drier heads, although more than three inches thick and "dished" inwardly for greater strength, were bowing outwardly under internal pressure and exerting radial bending moments on the ends of the shell which, as indicated by the strain gauges, were producing on the inside of the drier shell adjacent the joints between the shell and the heads, tensile stresses of alarming magnitude at relatively low internal pressures.

Accordingly, it is the principal object of this invention to produce a new form of large diameter drying cylinder, e.g., a Yankee drier, in which advantage can safely be taken of the higher rates of heat transfer permitted by thinner drier shells and which will be safely within the strength limits of the materials normally used. The ultimate object of the invention is the provision of greater drying capacity for Yankee paper machines and for other applications where large steam driers are employed.

The new concepts of the invention and the designs embodying them are explained with reference to the accompanying drawings in which:

FIGURE 1 is a sectional view taken on the longitudinal axis of a preferred commercial form of drier in accordance with the invention;

FIGURE 2 is an enlarged fragmentary sectional view of the drier of FIGURE 1, showing the joint between the drier shell and the drier head;

FIGURE 3 is a cross sectional view taken along the line 3—3 in FIGURE 1;

FIGURE 4 is a schematic fragmentary diagram of the drier of FIGURE 1 illustrating in part the method of stress analysis by which the principles herein set forth were discovered and the design of the drier of FIGURES 1 and 5 was evolved;

FIGURE 5 is a sectional view of a modified form of drier in accordance with the invention, also taken on the longitudinal axis.

FIGURE 6 is a sectional view of a Yankee drier of accepted commercial design and of the same general type as that which as previously described was tested to destruction.

FIGURE 12 is a three-dimensional graph defining the acceptable limits of certain design variables in driers in accordance with the invention;

FIGURE 16 is a table showing the stresses occurring under various conditions in the shells of five forms of drier shown diagrammatically therein in illustrations (A) to (E) inclusive.

Figure 7:
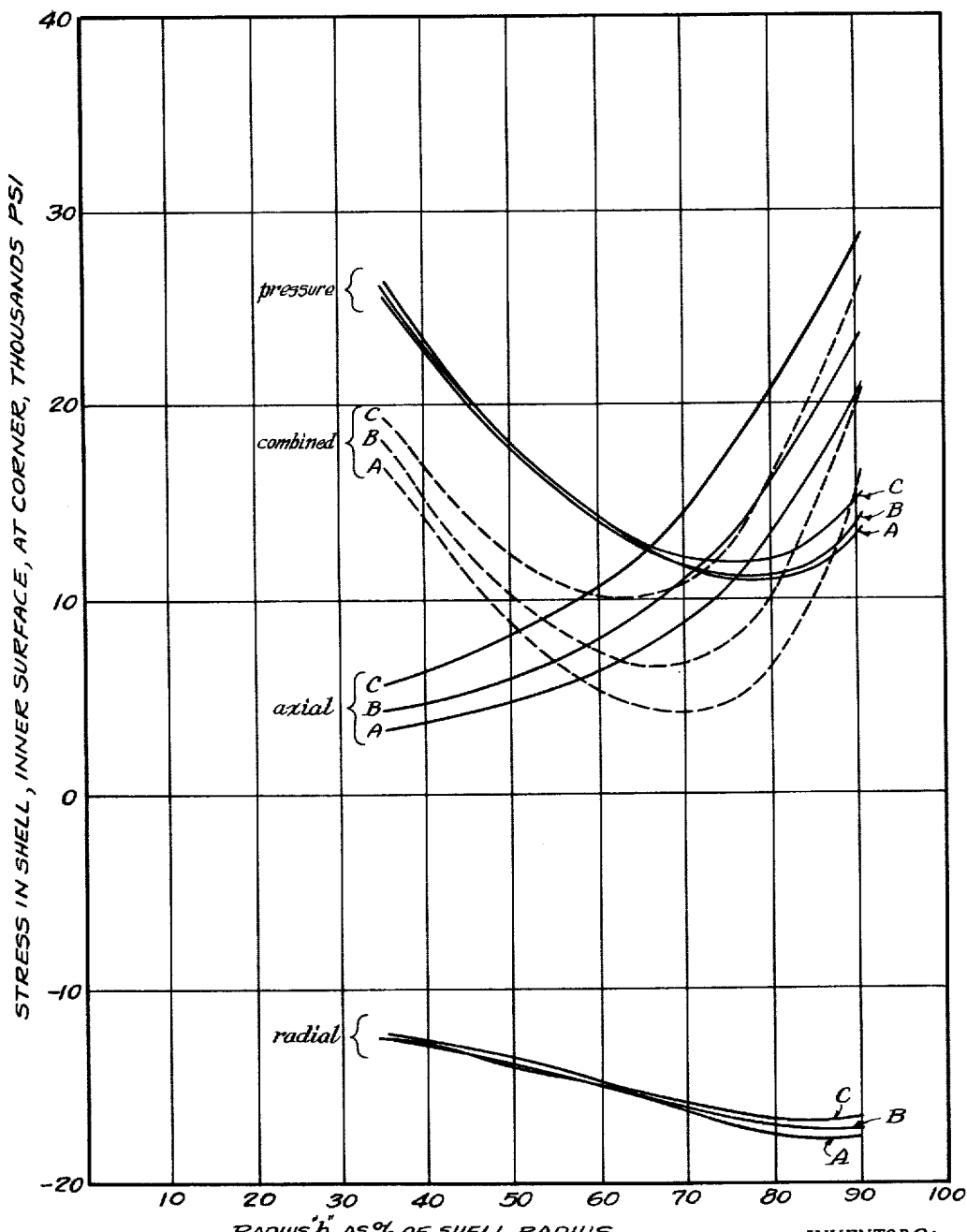
FIGURES 7, 8, and 9 are graphs showing the variation of the stresses occurring in the shell of the drier of FIGURE 1 at its inside surface near its junction with the head, with changes in certain design variables.

A drier in accordance with the invention seeks to prevent, under all normal operating conditions, such deformation of the head as would exert an excessive bending moment on the shell, and additionally, to influence the heads to deform under operating conditions in a manner such that the heads, at the point of their connections to the shell, will accommodate the deflection of the ends of the shell caused by internal pressure and by temperature differences between various parts of the drier. Within these concepts a number of designs, some of which are herein illustrated, and of which there may be variations, have been devised. Before proceeding directly to a description of the invention, it will be advantageous to reconsider the essential structural parts of any drier, as illustrated by the drier of accepted commercial design shown in FIG. 6.

A Yankee drier of conventional design comprises a cylindrical shell 20, a pair of end members or "heads" 22 secured to the shell, and a central shaft 24 extending through the dryer and secured to the drier heads. The central shaft is usually of cast construction, and is fabricated in two parts bolted together at the longitudinal center of the drier. The shaft is machined at its ends to provide suitable journals 26, and one end is provided with a stub or extension 28 for the mounting of a suitable gear or sprocket or the like to serve as the driving connection. To provide sufficient beam strength for its rather substantial span between bearings, the central shaft is quite thick in overall section, although a substantial saving of weight is effected by making the central portions hollow. This also facilitates the entry and exit of the heating medium, usually steam, which, in the construction shown in FIGURE 6, enters from the left and passes into the space between the shaft and the shell through suitable openings 30 in the periphery of a diaphragm 32 which separates the interior spaces of the two halves of the central shaft. The spent heating medium is removed from the inside of the drier shell by scoops which form part of the removal system, not shown, which conveys the spent medium out of the drying cylinder through the right hand end of the central shaft.

The drier heads 22 are in the form of dish shaped rings which are machined at their edges to provide bolting flanges 34 and 36 for their attachment to the central shaft and to the drier shell, respectively.

A preferred form of Yankee drier in accordance with the invention is shown in FIGURES 1 to 3 from which, as in FIGURE 6, the internal conduit system has been omitted for the sake of clarity. It will be apparent that a significant difference in form between a conventional drier and that of FIGURE 1, is that the heads are connected to one another by a plurality of very heavy staying members which are secured at their ends to inwardly-extending cylindrical extensions of the drier heads. A drier of this type, having a diameter of 12 ft., a shell length of 12 ft., and a shell thickness of 1⅝" has been tested in accordance with the A.S.M.E. Code for Unfired Pressure Vessels to a hydrostatic pressure of 250 lbs. per square inch for actual operation with steam at 125 lbs. per square inch pressure. The actual stresses in the shell and head, as confirmed by strain measurements, are conservatively within safe operating limits, and indicate that the drier could be operated safely at still higher pressures if that should be desired.

Specifically, the improved drier of FIGURES 1 to 3 comprises a thin cylindrical outer shell 38 which is rigidly secured at its ends to relatively flat, ring shaped heads 40, each of which is supported by a hollow central shaft 42. The shell is provided at each end with an integral bolting flange which is machined to mate with a similar peripheral flange of the drier head. The rigid attachment of the shell to the head may be made as shown by means of a plurality of bolts 44 (FIG. 2) inserted from the inside of the shell and drawn up by nuts on the outside of the head. To facilitate the assembly, the shell is provided on its inner side adjacent the bolting flange with a keying ring 46 formed integrally with the shell, which engages the heads of the bolts and prevents them from turning when the nuts are tightened.

Each of the heads 40 is provided with a manhole 47 to provide access to the interior of the drier for assembly and maintenance.

Formed integrally with each of the heads, and extending inwardly therefrom at a radial location which is of the essence of the invention, is a short cylindrical section 48 provided at its inner end with a machined bolting flange 50. Extending between the heads longitudinally of the drier and connecting the oppositely facing bolting flanges 50 of the short cylindrical sections 48 are a plurality of heavy staying members 52, the purpose of which is to control the bowing of the heads and thus to eliminate what will be shown to be the principal contributing factor in the maximum stress occurring in the shell of the conventional dryer, i.e., that which occurs at the inside surface of the shell at and near its connection to the head. The staying members 52 are of sufficient number, ten in the illustrated case, and of sufficient cross-section to permit substantially no axial strain, and thus to effectively prevent movement of the heads 40 relative to one another in the axial direction at the junction of the inner cylindrical member 48 with the drier head, and to control the bending moment exerted by the heads on the drier shell.

The central shaft 42 of the improved drier is also of cast construction and formed in two halves bolted together at the longitudinal center of the drier. Near each end, the shaft 42 is provided with an enlarged bolting flange 56 to which the heads 40 are rigidly secured by means of a plurality of bolts. The shaft is extended at each end to provide journals 58 for rotatably supporting the drier in suitable bearings, a shaft extension 60 being provided at one end of the shaft for mounting a driving gear or sprocket or the like. As in the conventional drier, the central shaft 42 is hollow to provide for the introduction of the heating medium at one end and its removal at the other, the two chambers of the shaft being separated by a diaphragm 62, which in this case is cast integrally with one of the half-sections of the shaft. The conduit means for the introduction of the heating medium to the interior of the drier, and for its removal therefrom, form no part of the present invention and are omitted from the drawings for the sake of clarity.

Referring to FIGURE 1, it will be noted that, as in the shafts of conventional driers, the walls of the shaft 42 are very heavy in the vicinity of the bolting flanges 56 and journals 58, and therefore relatively inflexible in the axial direction.

The modified drier of FIGURE 5 comprises a thin cylindrical outer shell 64 which is rigidly secured at its ends to ring shaped heads 66 which are markedly narrower, in the radial direction, than the heads of the driers of FIGS. 1 or 6. The shell 64 is similarly provided at each end with a bolting flange 68 which is machined to mate with an outer peripheral flange 70 of the drier head.

The hollow central shaft or flue 72 of the drier is somewhat enlarged in comparison with the driers of FIGS. 1 and 6 and is formed in three sections, a center section 74 having an integral partition 76 dividing the interior space into two chambers, as with the other driers illustrated, and two end sections 78, the three sections being securely bolted together as at 82. Each end section comprises a bell or dome-shaped casting 84 which is reinforced on its inside by a plurality of ribs 86 which merge with an inwardly extending hub 88. It will be apparent that the reinforcing ribs 86 stiffen the shaft end against deflection in the axial direction under internal pressure. Extending outwardly from each end section is a stub shaft 90 machined to provide a journal 92 for supporting the drier in suitable bearings, not shown, one of the stub shafts being slightly longer than the other for receiving a driving gear or sprocket or other suitable driving connection.

Each end section 78 is provided with a bolting flange 94 machined to mate with an inner peripheral flange 96 of one of the drier heads 66 for securing the heads rigidly to the central shaft.

The radius of the rigid end section 78 of the shaft 72, i.e., the radius of the inner bolt circuit, is of particular importance to the modification of FIGURE 5, as will be later fully explained. The radius of the central portion of the shaft or flue 72 may be chosen with considerable latitude so long as sufficient cross-section is provided to keep the rigid shaft ends 78 from moving out any significant distance under pressure, and so long as the shaft ends themselves are sufficiently rigid that the inner peripheries of the heads are axially immovable in response to internal pressure.

As with the driers of FIGS. 1 and 6, the steam distribution and condensate removal apparatus are omitted for sake of clarity, but it will be understood that live steam enters the space between shell and shaft from one end of the shaft and the condensate is collected and removed through the other end.

The preferred design of FIGURES 1 to 3 and the modified form of FIGURE 5 proceed upon the basis that since the high stresses which caused failure of the test shell at its end were believed due to a bending moment in the shell caused by bowing of the drier heads, the most effective way of preventing shell failure is to tie the heads together by means sufficiently inelastic to substantially prevent the undesirable bulging under internal pressure. It was found, however, that merely staying the heads is insufficient. The staying forces, to be effective, must be applied to the heads within a particular range of radial locations, specifically from 55% to 95% of the shell radius, the limits of the range varying somewhat according to several factors: e.g. the degree of flexibility of the drier heads, the various dimensions of the drier, the materials chosen, and the manner of application of the staying forces.

The optimum location or range of locations for the application of the staying forces to the heads has been determined by mathematical determination of the forces acting on the drier, and the stresses which result, for various radial locations of the staying forces, and for various combinations of this and other design factors. The mathematical determination has been confirmed, as previously indicated, by strain measurements of a full size drier built in accordance with FIGURES 1 to 3 and now in commercial operation. The method of analysis is shown by the following illustration.

ANALYSIS OF FORCES AND STRESS DUE TO INTERNAL PRESSURE

In FIGURE 4, the drier of FIGURES 1 to 3 is reproduced in simplified diagrammatic form with parts corresponding to the actual drier members numbered in the same manner. The drier shell 38 is a cylinder of radius $a$ and thickness $t_a$, the central shaft 42 is an inner cylinder of radius $c$ and thickness $t_c$, and the staying members 52 and short cylindrical sections 48 are assumed for the analysis to be a unitary cylinder 52—48 of radius $b$ and thickness $t_b$. The head 40 is taken to be a flat circular plate of radius $a$ and thickness $T$ but having a thicker, massive inflexible hub portion of the radius $H \geq c$.

In addition to a uniform internal pressure $p$, the forces acting on the head 40, and also on the attached cylinders 38, 52—48, and 42, include:

$R_c$: axial force per unit circumference exerted by cylinder 42 on the head, and vice versa. (There is no moment because the head does not flex at $r<H$, and the pressure and temperature are the same on the inside and outside of the central shaft.)

$R_b$: axial force per unit circumference exerted by the staying cylinder 52—48, on the head, and vice versa.

$M_b$: radial bending moment, per unit circumference, exerted by cylinder 52—48 on the head, and vice versa.

$R_a$: axial force per unit circumference exerted by the shell 38 on the head, and vice versa.

$M_a$: radial bending moment, per unit circumference, exerted by the shell 38 on the head, and vice versa.

$Q_a$: radial shear force per unit circumference exerted by shell 38 on the head, and vice versa.

Notwithstanding the equality of pressure on both sides of cylinder 52—48, a radial shear force $Q_b$ (not shown in FIG. 4) is introduced by the bending of the head, but $Q_b$ is small in its effect upon the stress in the shell and was therefore disregarded. To have taken it into account would have tremendously complicated the calculations with no significant effect.

Under any given set of conditions, i.e., dimensions, pressures, temperatures, structural materials etc., it is possible to determine the six forces and moments given above, and the resulting stresses. All are related to the deflection of the drier head, which may be expressed, in terms of the radius of the head, in the following third order differential equation:

$$\frac{d}{dr}\left[\frac{1}{r}\frac{d}{dr}\left(r\frac{dw_i}{dr}\right)\right] = \frac{Q_i}{D} \quad *1 \quad (A)$$

In this expression,
$w_i$ is the axial deflection of the head at any radius $r$ in region $i$,
$Q_i$ is the axial shear force in the head per unit circumference in region $i$, and
$D$ is the flexural rigidity of the head.
$i$ is Region 1 or 2 (see FIG. 4), which must be separately considered since the axial shear force $Q_i$, and thus the deflection $w_i$, is not the same in both regions.

*1 Timoshenko: "Theory of Plates and Shells," 1st Ed., 7th Impression, 1940, p. 58, Equation 57.

When Equation A is integrated under the conditions of FIGURE 4 to obtain expressions for $w_i$, there will be three constants of integration for each region $i$. The evaluation of the resulting six constants of integration, together with the evaluation of the six forces and moments illustrated in FIG. 4, requires a set of 12 independent, simultaneous algebraic equations. To have taken the radial shear force $Q_b$ into account so that its magnitude and effect could be precisely determined, would have increased the number of simultaneous equations from 12 to 17.

In defining the twelve conditions which must be satisfied, it is convenient to employ a series of symbols which for handy reference are gathered from the foregoing and following portions of this specification into a glossary which follows as Table I.

Table I
GLOSSARY $a$: mean radius of drier shell, inches
$b$: means radius of cylindrical staying member, inches
$c$: mean radius of central shaft, inches
$H$: radius of rigid hub of drier head
$t_a$: wall thickness of drier shell, inches
$t_b$: wall thickness of staying cylinder, inches
$t_c$: wall thickness of central shaft, inches
$T$: thickness of deformable portion of the drier heads, inches
$r$: radius, inches
$L$: length of drier shell, inches (sometimes called "face width")
$p$: internal pressure, p.s.i.g.
$Q_a$: radal shear force per unit circumference exerted on the drier shell by the head, or vice versa, lb./in.
$R_a$: axial force per unit circumference exerted by the head on the drier shell, and vice versa, lb./in.
$R_b$: axial force per unit circumference exerted by the head on cylinder $b$ and vice versa, lb./in.
$R_c$: axial force per unit circumference exerted by the head on the central shaft, and vice versa, lb./in.
$M_a$: moment per unit circumference exerted on the head by the drier shell, and vice versa, lb.-in./in.
$M_b$: moment per unit circumference exerted on the head by the cylinder $b$, and vice versa, lb.-in./in.
$i$: region $i$ of the head, where $i$ is 1 or 2 (see FIG. 4)
$Q_i(r)$: axial shear force in the head per unit circumference, at any radius $r$ in region $i$, lb./in.
$M_i(r)$: radial bending moment in the head, per unit circumference, at any radius $r$ in region $i$, lb.-in./in.=

$$M_i(r) = -D(w_i'' + \nu w_i'/r) \quad *2$$

$M_{ti}(r)$: tangential bending moment in the head at radius $r$ in region $i$:

$$M_{ti}(r) = -D\left(\frac{w_i'}{r} + \nu w_i''\right) \quad *3$$

$w_i(r)$: deflection of the head, positive to the right in FIG. 4, in region $i$ at any radius $r$, inches
$w_i'(r)$: radial slope of the head at radius $r$ in region $i$, or 1st derivative of the deflection with respect to radius $r$
$w_i''(r)$: rate of change of the radial slope of the head with respect to the radius at radius $r$ in region $i$, or 2nd derivative of the deflection with respect to radius $r$
$w_a(x)$: radial deflection of the shell at distance $x$ from the head, positive toward the drier axis, inches
$w_a'(x)$: slope of shell at distance $x$ from the head
$\epsilon_z$: unit axial strain at the drier shell, in./in.
$E$: modulus of elasticity, p.s.i.
$\nu$: Poisson's ratio
$D$: flexural rigidity of a flat circular plate:

$$ET^3/12(1-\nu^2) \quad *4$$

*2 Note 1, p. 56, Equation 52.
*3 Note 1, p. 56, Equation 53.
*4 Note 1, p. 3, Equation 3.

$D_k$: flexural rigidity of a cylinder of radius K:

$$Et_k^3/12(1-\nu^2) \qquad *5$$

$\beta_k^4$: $\qquad 3(1-\nu^2)/k^2t_k^2 \qquad *6$ where $k=a$, $b$ or $c$ $\sigma_{AK}$: axial stress in a thick walled cylinder of radius K, p.s.i.

$\sigma_{rH}$: radial stress in the surface of the head, p.s.i.

$\sigma_{tH}$: tangential stress in the surface of the head, p.s.i.

$C_{ij}$: jth constant of integration of the head deflection curve expression, where $j$ is 1, 2 or 3, and $i$ is 1 or 2 ln: natural logarithm

The twelve conditions which must be simultaneously met are the following:

(1) Since the drier head is in static equilibrium, the internal pressure $p$ exerted outwardly against the head is balanced by the restraining forces of the shell 38, the staying cylinder 52—48 and the central shaft 54. Thus:

$$2\pi a R_a + 2\pi b R_b + 2\pi c R_c - \pi a^2 p = 0 \qquad (1)$$

(2) The deflection of the head where it joins the shell 38 must be equal to the change in half-length of the shell caused by the applied pressure and the applied axial force. It has been shown that in a cylinder subjected only to internal pressure, the sum of the radial and tangential stresses is $$\sigma_r + \sigma_t = \frac{(a-t_a/2)^2}{at_a}p \qquad *7$$

Applying the generalized expression of Hooke's law, the resulting axial strain is $$\epsilon_a = \frac{1}{E}\left[\frac{R_a}{t_a} - \nu\frac{(a-t_a/2)^2}{at_a}p\right] \qquad *8$$

Since the radius of the shell is very large compared with its half-thickness, the latter may be neglected and the strain equation simplified to $$\epsilon_a = \frac{1}{Et_a}(R_a - pa\nu)$$

Thus the change in half-length of the shell is simply $$\frac{L}{2Et_a}(R_a - pa\nu)$$

Reverting back to the original proposition that the axial deflection of the head at its outer rim is equal to the change in half-length of the shell, we have $$w_{1,r=a} = \frac{L}{2Et_a}(R_a - pa\nu) \qquad (2)$$

(3) and (4) The deflection of the head at the point of attachment of the staying cylinder 52—48, whether computed as a deflection in Region 1 or a deflection in Region 2, is equal to the change in half-length of the staying cylinder. Thus:

$$w_{1,r=b} = \frac{L}{2E}\left(\frac{R_b}{t_b} + 2p\nu\right) \qquad (3)$$

and $$w_{2,r=b} = \frac{L}{2E}\left(\frac{R_b}{t_b} + 2p\nu\right) \qquad (4)$$

(5) The deflection of the head at its attachment to the massive, inflexible hub, and the axial movement of any part of the hub, is equal to the change in half-length of the central shaft or inner cylinder 42. Thus:

$$w_{2,r=H} = \frac{L}{2E}\left(\frac{R_c}{t_c} + 2p\nu\right) \qquad (5)$$

(6) The radial deflection of the shell 38 at its ends is equal to the sum of the deflections of the head at its junction with the shell, due to radial stretching of the head, and to the bending of the head. Thus:

$$-w_0 = \frac{aT^2(a^2-H^2)}{12D[a^2(1+\nu)+H^2(1-\nu)]} \overset{*9}{} + \frac{T}{2}w'_{1,r=a} \qquad *10$$

$$(6)$$

(7) The slope of the curve of deflection of the head at the point where the head joins the massive, inflexible hub, is zero, since the connection is rigid and the hub does not flex. Thus $$w'_{2,r=H} = 0 \qquad (7)$$

(8) The slope of the head in Region 1 at $r=b$ is the same as the slope of the head in Region 2 at $r=b$. Thus:

$$w'_{1,r=b} = w'_{2,r=b} \qquad (8)$$

(9) The shell and the head are rigidly connected and the angle between them is always a right angle. Thus the slope of the shell at its end is the negative of the slope of the head at its outer rim, or $$w'_{1,r=a} = -w'_0 \qquad (9)$$

(10) The radial bending moment in the head at its outer rim equal to the applied radial bending moment, or $$M_{1,r=a} = M_a - \frac{T}{2}Q_a \qquad (10)$$

(11) The radial bending moment exerted on the head by the staying cylinder 52—48 must be the difference between the radial bending moments in the two regions on either side of the staying cylinder. Thus:

$$M_{2,r=b} = M_{1,r=b} + M_b \qquad (11)$$

(12) The moment exerted on the head by the staying cylinder 52—48 is related to the slope of the staying cylinder at its end, and thus to the slope of the head at the point of its attachment to the staying cylinder, the slope of one being the negative of the slope of the other. The slope at the loaded end of a cylinder is given by $$w'_{0,b} = \frac{M_b}{B_bD_b} + \frac{1}{2\beta_b^2D_b}Q_{0b} \qquad *11$$

Since, as already indicated, the radial shear force $Q_{0,b}$ exerted by the staying cylinder on the head, contributes insignificantly to the radial bending moment, and thus to the stress in the shell at its ends, it is neglected, and the foregoing equation becomes $$w'_{0,b} = \frac{M_b}{\beta_bD_b}$$

or, $$M_b = \beta_bD_bw'_{0,b}$$

or, since the slope of the staying cylinder at its end is the negative of the slope of the head at radius $b$, $$M_b = -\beta_bD_bw'_{1,r=b} \qquad (12)$$

---

*5 Note 1, p. 391, Equation (f).
*6 Note 1, p. 392, Equation 229.
*7 Timoshenko, Strength of Materials, Part II, 2nd Ed., Thirteenth Printing, 1952, p. 239, Equations 201 plus 202.
*8 Timoshenko, Theory of Elasticity, 1st Ed., 7th Impression, 1934, p. 8.
*9 Timoshenko, Strength of Materials, Part II, 2nd Ed., Thirteenth Printing, 1952, pp. 236–238.
*10 Transactions, A.S.M.E., vol. 74, August 1952, pp. 1083–92, Watts and Lang.
*11 See Note 1, p. 393, Equation 234.

The foregoing twelve independent relationships, expressed in terms of the previously mentioned twelve unknowns (i.e. the six forces and moments of FIG. 4, plus the six constants of integration of the equation, (A), of the deflection curve of the head in Regions 1 and 2) may be solved simultaneously to render values for the twelve unknowns for any given values of the design variables, e.g., thicknesses, lengths, materials, etc.

Expressions for the deflections, slopes, and moments of the head are derived by integration of the deflection curve Equation A, but as a preliminary, it is desirable to express the longitudinal or axial shear force $Q_1$ per unit circumference in Regions 1 and 2 as a function of the axial forces R exerted on the head by the staying cylinder 52—48 and the central shaft 54. Thus:

$$Q_1 = \frac{p\pi r_1^2 - 2\pi b R_b - 2\pi C R_c}{2\pi r_1}$$

$$= \frac{pr_1}{2} - \frac{bR_b + cR_c}{r_1}$$

and $$Q_2 = \frac{pr_2}{2} - \frac{cR_c}{r_2}$$

For convenience, the foregoing equations may be restated generally as $$Q_i = \frac{pr}{2} - \frac{1}{r}\psi_i$$

where $$\psi_1 = bR_b + cR_c$$
$$\psi_2 = cR_c$$

Then, integrating the deflection curve Equation A and

*12 See Note 1, p. 393, Equation 233.
*13 See Notes 7 and 8, relative to Equation 2.
*14 See Note 1, p. 393, Equation 234.

solving for the deflection, $w_i$, of the head (Equations 2, 3, 4, 5) we have:

$$w_i = \frac{pr^4}{64D} + \frac{\psi_i}{D4}r^2(1 - \ln r) + \frac{C_{i1}}{4}r^2 + C_{i2}\ln r + C_{i3}$$
(13)

Similarly, the slope (Equations 6, 7, 8, 9, 12) becomes $$w_i' = \frac{pr^3}{16D} = \frac{\psi_i}{4D}(1 - 2\ln r) + \frac{C_{i1}}{2}r + \frac{C_{i2}}{r} \quad (14)$$

and the radial bending moment (Equations 10 and 11) is $$M_i = -\frac{3+\nu}{16}pr^2 + \psi_i\left[\frac{1-\nu}{4} + \frac{1+\nu}{2}\ln r\right]$$
$$-D\frac{1+\nu}{2}C_{i1} + D\frac{1-\nu}{r^2}C_{i2}$$
(15)

The deflection of the end of the shell (Equation 6) is given by the expression $$w_{0,x=0} = -\frac{1}{2\beta_a^3 D_a}(\beta_a M_0 + Q_0) - \left[\frac{pa^2}{Et_a} - \frac{a\nu}{Et_a}R_a\right] \quad \text{*12}$$
$$\text{*13}$$
(16)

and the slope of the shell at its end (Equation 9), is therefore $$w_{0,x=0} = -\frac{1}{2\beta_a^3 D_a}(2\beta_a M_0 + Q_0) \quad \text{*14} \quad (17)$$

By substituting for $w_i$, $w_i'$, $M_i$, $w_0$ and $w_0'$ in Equations 1 to 12 inclusive, their equivalents as shown by Equations 13 to 17 respectively, and transposing all values to the left hand side of the equation so as to equate the sum to zero, the twelve equations then become as set forth in Table II below:

*Table II*

| | | | Variables | | | | |
|---|---|---|---|---|---|---|---|
| $C_{11}$ | $C_{12}$ | $C_{13}$ | $C_{21}$ | $C_{22}$ | $C_{23}$ | $R_b$ | $R_c$ |
| 0 | 0 | 0 | 0 | 0 | 0 | $b$ | $c$ |
| $\frac{a^2}{4}$ | $\ln a$ | 1 | 0 | 0 | 0 | $\frac{a^2 b}{4D}(1-\ln a)$ | $\frac{a^2 c}{4D}(1-\ln a)$ |
| $\frac{b^2}{4}$ | $\ln b$ | 1 | 0 | 0 | 0 | $\frac{b^3}{4D}(1-\ln b) - \frac{L}{2Et_b}$ | $\frac{b^2 c}{4D}(1-\ln b)$ |
| 0 | 0 | 0 | $\frac{b^2}{4}$ | $\ln b$ | 1 | $-\frac{L}{2Et_b}$ | $\frac{b^2 c}{4D}(1-\ln b)$ |
| 0 | 0 | 0 | $\frac{H^2}{4}$ | $\ln H$ | 1 | 0 | $\frac{H^2 c}{4D}(1-\ln H) - \frac{L}{2Et_c}$ |
| $\frac{aT}{4}$ | $\frac{T}{2a}$ | 0 | 0 | 0 | 0 | $\frac{abT}{8D}(1-2\ln a)$ | $\frac{acT}{8D}(1-2\ln a)$ |
| 0 | 0 | 0 | $\frac{H}{2}$ | $\frac{1}{H}$ | 0 | 0 | $\frac{Hc}{4D}(1-2\ln H)$ |
| $\frac{b}{2}$ | $\frac{1}{b}$ | 0 | $-\frac{b}{2}$ | $-\frac{1}{b}$ | 0 | $\frac{b^2}{4D}(1-2\ln b)$ | 0 |
| $\frac{a}{2}$ | $\frac{1}{a}$ | 0 | 0 | 0 | 0 | $\frac{ab}{4D}(1-2\ln a)$ | $\frac{ac}{4D}(1-2\ln a)$ |
| $-\frac{1+\nu}{2}$ | $\frac{1-\nu}{a^2}$ | 0 | 0 | 0 | 0 | $\frac{b}{D}\left[\frac{1-\nu}{4} + \frac{1+\nu}{2}\ln a\right]$ | $\frac{c}{D}\left[\frac{1-\nu}{4} + \frac{1+\nu}{2}\ln a\right]$ |
| $-\frac{1+\nu}{2}$ | $\frac{1-\nu}{b^2}$ | 0 | $\frac{1+\nu}{2}$ | $-\frac{1-\nu}{b^2}$ | 0 | $\frac{b}{D}\left[\frac{1-\nu}{4} + \frac{1+\nu}{2}\ln b\right]$ | 0 |
| 0 | 0 | 0 | $\frac{b}{2}$ | $\frac{1}{b}$ | 0 | 0 | $\frac{bc}{4D}(1-2\ln b)$ |

Table II—Continued

| \multicolumn{4}{c|}{Variables—Continued} | | \multicolumn{3}{c}{Constant terms} |
|---|---|---|---|---|---|---|
| $R_a$ | $M_a$ | $Q_a$ | $M_b$ | Unit pressure | $a$ | $r$ |
| $a$ | 0 | 0 | 0 | $-\dfrac{a^2}{2}$ | 0 | 0 |
| $-\dfrac{L}{2Et_a}$ | 0 | 0 | 0 | $\dfrac{a^4}{64D}+\dfrac{La\nu}{2Et_a}$ | $+.02$ | 0 |
| 0 | 0 | 0 | 0 | $\dfrac{b^4}{64D}-\dfrac{L\nu}{E}$ | 0 | 0 |
| 0 | 0 | 0 | 0 | $\dfrac{b^4}{64D}-\dfrac{L\nu}{E}$ | 0 | 0 |
| 0 | 0 | 0 | 0 | $\dfrac{H^4}{64D}-\dfrac{L\nu}{E}$ | 0 | 0 |
| $\dfrac{a\nu}{Et_a}$ | $\dfrac{1}{2\beta_a^2 D_a}$ | $\dfrac{1}{2\beta_a^3 D_a}+\dfrac{aT^2(a^2-H^2)}{12D[a^2(1+\nu)+H^2(1-\nu)]}$ | 0 | $\dfrac{a^3 T}{32D}-\dfrac{a^2}{Et_a}$ | 0 | $+.02$ |
| 0 | 0 | 0 | 0 | $\dfrac{H^3}{16D}$ | 0 | 0 |
| 0 | 0 | 0 | 0 | 0 | 0 | 0 |
| 0 | $-\dfrac{1}{\beta_a D_a}$ | $-\dfrac{1}{2\beta_a^2 D_a}$ | 0 | $\dfrac{a^3}{16D}$ | 0 | 0 |
| 0 | $-\dfrac{1}{D}$ | $\dfrac{T}{2D}$ | 0 | $-\dfrac{3+\nu}{16D}a^2$ | 0 | 0 |
| 0 | 0 | 0 | $\dfrac{1}{D}$ | 0 | 0 | 0 |
| 0 | 0 | 0 | $-\dfrac{1}{\beta_b D_b}$ | $\dfrac{b^3}{16D}$ | 0 | 0 |

In Table II, the twelve horizontal tiers are equations which correspond respectively, from top to bottom, to the foregoing Equations 1 to 12 after substitution therein of the expressions of Equations 13 to 17 inclusive. Each vertical column represents the coefficients, in the Equations 1 to 12, of the one of the twelve unknowns at the head of the column, the signs of the coefficients, and of the constant term (expressed as a coefficient of unit pressure, also a constant; 13th column, l. to r.), being those determined by placing all terms on the left hand side of the equation in all cases. For example, Equation 1 taken from Table II, reads as follows:

$$aR_a + bR_b + cR_c - \frac{a^2}{2} = 0$$

which will be recognized as a simplified form of Equation 1 as initially given, if $p$ be unity.

When the twelve equations of Table II are solved, the various stresses of interest in the drier can be computed for any given internal pressure by multiplying the values of the unknowns derived for unit pressure by the actual pressure, and substituting them into relatively simple formulae. The axial stresses in the shell, the most important stresses in most cases, are obtained from the formula $$\sigma_{Aa} = \pm \frac{6M_a}{r_a^2} + \frac{R_a}{t_a} \quad \text{*15} \quad (18)$$

where the upper sign applies to the outer surface of the cylinder and the lower sign to the inner surface. The same formula can be used to calculate the axial stress in the bracing cylinder $b$ and the central shaft $c$, the moment in the latter, due to internal pressure, being zero by hypothesis.

The radial stresses in the surfaces of the head at its junction with the shell are given by $$\sigma_{rH} = \pm \frac{6M_a}{T^2} + \frac{Q_a}{T} \quad \text{*16} \quad (19)$$

where again, the upper sign refers to the outer surface and the lower sign to the inner surface.

---
* 15 Timoshenko, Strength of Materials, Part I, Second Ed., Fourteenth Printing, February 1953, Chap. IV, p. 92, Equations 60 et seq.
* 16 See Note 15.

The stresses in the surfaces of the head at points other than at its outer rim can be computed from the values of the radial bending moment, $M_i$, given by Equation 15 and from the tangential bending moment, $M_{it}$, which are substituted in the formula immediately above. The tangential bending moment is obtained from the expression $$M_{i,\text{tan}} = -\frac{1+3\nu}{16}pr^2 - \left[\frac{1-\nu}{4} - \frac{1+\nu}{2}\ln r\right]\psi_i$$
$$\quad -\frac{1+\nu}{2}DC_{i1} - \frac{1-\nu}{r^2}DC_{i2}$$
$$= -D\left(\frac{1}{r}w_i' + \nu w_i''\right) \quad \text{*17} \quad (20)$$

When, as in this case, the object is to build a drier shell as thin as is consistent with safety by all acceptable standards, the aim is to keep the shell stresses, and therefore, the factors contributing to shell stress, as small as possible, the design of the other members insofar as they may be unrelated to the primary objective being simply a matter of proportioning the parts heavy enough to keep the stresses (or strains, where they control) at a low value. The relative effects of changes in the design variables which are selected as parameters in the multiple solutions of the twelve equations, will be discussed later.

Thus far in the analysis, there has been considered only the effect upon the shell stresses of internal pressure, no notice having been taken of actual operating conditions. Of course, the effect of pressure alone is important because there are times when, for various reasons, a drier is under pressure but not actually drying anything. However, when a relatively cold, wet sheet is applied to the shell, its temperature drops drastically relative to the temperature, for example, of the heads and of the staying cylinder and the central shaft. Specifically, at operating steam pressures of 125 p.s.i.g. the steam temperature (wet or saturated) is approximately 353° F., and before the wet sheet is applied, the temperature of the shell at its outside surface is only a few degrees less than the inside. When the sheet is applied, the outside temperature of the shell is believed to drop to about 185° F., with a resulting average temperature of roughly 270° F. At this temperature, the shell is materially smaller, radially and longi- ---
* 17 See Note 3.

tudinally, than it was at the steam temperature of 353° F., but because no comparable shrinkage of the heads or other parts is effected, the conforming of the other parts to the shrinkage of the shell sets up additional stresses in the shell and those other parts.

ANALYSIS OF STRESSES UNDER OPERATING CONDITIONS

Under operating conditions, that is, with a sheet applied to the surface of the shell, the shell 38 is cooler, and therefore shorter and smaller in diameter than it would be in the absence of the wet sheet. The staying cylinder 48—52 (FIG. 4) remains essentially unchanged in length as does the central shaft 42. Thus the rims of the drier heads are pulled axially inwardly, and also radially inwardly, the latter being due both to the rotation of the rims and to the radial shrinkage of the shell. To the extent that the head resists this movement, it becomes stressed itself, and it sets up additional stresses in the shell, primarily bending, but also in part axial due to the longitudinal shrinkage of the shell, over and above those stresses which are occasioned merely by internal pressure. As will later be shown, however, the direction of the bending moment caused by radial shrinkage of the shell is opposite to that caused by internal pressure and longitudinal shrinkage, with the result that the stresses introduced by mere internal pressure at operational level may be partially relieved under operating conditions.

The axial and radial shrinkage of the shell under the operating conditions of the drier can be readily calculated from the dimensions of the shell, the co-efficient of thermal expansion of the shell material, cast iron in the usual case, and the difference between the temperature of the shell under operating steam pressures but without the sheet and its temperature under operating conditions. Once the amount of shrinkage is determined, the forces and stresses due to the shrinkage can be readily determined in one of a number of ways which may be selected according to convenience.

For example, referring to the foregoing equations, the axial shrinkage of the shell is taken into account in Equation 2 and the radial shrinkage of the shell taken into account in Equation 6, simply by adding or subtracting, according to the sign convention, the axial or radial shrinkage from the axial or radial deflection due to internal pressure, and then re-solving all of the equations to obtain new values for the twelve unknowns. The stresses may then be re-computed from the twelve unknowns, and the computations will then render the various stresses under a particular given set of operating conditions, dimensions, materials, etc. of the drier.

However, it may well be desired to examine the effect of the temperature drop in the shell independently of the effect of the internal pressure, or further, to examine the effect of the longitudinal shrinkage due to the temperature drop in the shell, separately from the effect of the radial shrinkage.

Accordingly, it is desirable for accumulation of design data to compute the stresses due to axial and radial shrinkage independently of one another, and independently of the stresses due solely to internal pressure, and to combine them as needed to examine the stresses for any drier length under any given state of conditions.

Thus, to determine the effect only of axial shrinkage of the shell, the known terms (column 13, Table II) in Equations 1 to 12, which are coefficients of unit pressure, are made equal to zero, and the amount of the axial shrinkage under the given condition is inserted as the known term of Equation 2.[18] When the twelve equations as thus modified are solved, the stresses due solely to axial shrinkage and may be computed from Equations 18 to 20 in the manner already explained.

Similarly the effect of radial shrinkage alone is determined by again equating the known term of each of the twelve equations to zero, and adding the radial shrinkage as the known term of Equation 6.*[18] The equations are then resolved a third time and from the values of the twelve unknowns thus determined, the stresses due solely to the radial shrinkage of the shell can be computed.

Also with regard to design convenience, it will be appreciatde that the absolute shrinkage of the shell varies with the temperature as well as with the length, and that it will be desirable to examine the stresses over a fairly wide range of temperature differences in a particular shell to bracket the operating conditions. Since it would be intolerably laborious to re-calculate new solutions of the twelve equations for each temperature condition, the shrinkage of the half-length of any given length of shell and other conditions is calculated for one temperature, the shrinkage factor actually shown in Table II being taken arbitrarily to be .020 inch. It will be appreciated by reversion to the principles of solution of simultaneous equations by the determinant method, that when the known term, i.e., the pressure term, of the equations of Table II, is equal to zero, a change in either the radial or axial shrinkage will effect a directly proportional change in the values of the twelve unknowns, obtained by a solution of the equations for the effects of either radial or axial shrinkage alone. Thus the effects of a change in either the axial or radial shrinkage alone, upon the twelve unknowns determined by any one solution for the values of the unknowns due solely to such shrinkage, can be determined rather simply by direct proportion without the need for again solving the twelve equations.

To illustrate, for the operating conditions previously given, i.e., steam pressure, gauge, of 125 lbs. per square inch, the steam temperature is approximately 353° F., but with the wet sheet on the shell, the outside temperature of the shell at the point of application of the wet sheet is in the neighborhood of 185° F. The average temperature of the shell at this point is therefore some 84° F. less than the temperature of the shell without the sheet, and the resulting axial shrinkage in a drier shell of cast iron, 140" long, is actually .035 inch. The stress introduced by the actual axial shrinkage alone under these conditions is determined by the insertion in Equations 18 to 20 of the unknowns obtained from the solutions of the equations tabulated in Table II with $p$ equal to zero and the axial shell shrinkage (Equation 2) equal to .020", after those unknowns have been increased by a factor of 35/20 or 1.75.

EFFECTS OF CHANGES IN THE SIGNIFICANT PARAMETERS

The foregoing analysis provides the means for determining the stresses at various points in the drier, thereby permitting the designer to identify the significant stresses, to determine whether those stresses are within safe limits, and to discover the optimum form and location of such of the component parts of the drier as are within his control.

As already pointed out, it was discovered through the failure of a thin shelled conventional drier of large diameter, and subsequently confirmed by strain gage measurements and later by calculation, that in a conventional drier construction in which a drier shell is thinner the drier head, the greatest stress occurs in the shell at its inside surface at or near its junction with the head.

To determine the effects upon this stress of changes of location and size of these elements which are within the designer's control, it is necessary, after the design constant such as drier length, diameter, shell thickness, etc., have been selected, to solve the foregoing set of

---

*[18] The direction of both radial and axial shrinkage is opposite to the deflection direction assumed to be positive, wherefore the shrinkage deflection is in the negative direction. However, as all of the terms are transposed to the left hand side of the equation in Table II, the shrinkage term becomes positive.

Equations 1 to 12 numerous times, selecting as parameters the size and location of those elements which are within the designer's discretion. For example, in one set of solutions, for a drier of the preferred form, the radius $b$ of the staying cylinder was varied while the other design variables were held constant. Similarly, the effects of varying the hub radius H, the head thickness T, the shell radius $a$, etc., individually, while holding the other variables constant, were determined.

Specifically, in the investigation of a drier of the preferred form having a shell radius of 72″, a length or "face width" of 140″, a shell thickness of 1½″, head thickness 3″, staying cylinder thickness 3″, and shaft thickness 3½″, and hub radius (i.e. bolt circle radius) 20″, and shaft radius less than 20″, the radius $b$ of the staying cylinder was increased in increments of 5 inches, from 25″ to 65″, and the stress in the shell at its junction with the drier head was calculated for each incremental variation. A determination was made not only of the effect of internal pressure upon the stress at the critical location in the shell, but also of the effect upon those stresses of the shrinkage of the shell which occurs when the shell is cooled by the wet sheet under actual operating conditions.

The axial stress in the shell at its inner surface near the head for internal steam pressure of 125 p.s.i.g., is plotted in the curves of group A of FIGURE 7 as the ordinate against the radius, $b$, of the staying cylinder as the abscissa, the latter being expressed in terms of percent of the shell radius $a$. The components of the axial shell stress due solely to internal pressure, to axial shrinkage of the shell, and to radial shrinkage of the shell, are plotted separately in solid lines and the combined stress is plotted as a broken line. From the graph it will be observed that the component of the axial shell stress due solely to internal pressure is at a minimum when the radius $b$ of the staying cylinder is in the neighborhood of 78% of the shell radius $a$, but that when the cold sheet is applied to the drier, the further bending effects produced by shell shrinkage reduced the total stress to something less than half of the stress due solely to internal pressure, while at the same time lowering the optimum radius of the staying cylinder to approximately 70% of the shell radius.

From FIGURE 7 it will also be apparent that the component of stress introduced by axial shrinkage of the drier shell is of the same sign as that which is occasioned by internal pressure alone, and that as the portion of the head outwardly of the staying cylinder becomes less flexible in the axial direction, i.e., as the radius $b$ of the staying cylinder increases, the magnitude of the component of stress attributable to axial shrinkage becomes substantially greater.

Equally apparent is the fact that the radial contraction of the shell has the opposite effect, tending to counteract the effects both of internal pressure and axial shrinkage of the shell. It, too, becomes greater as the radius $b$ of the staying cylinder increases, but to a lesser degree.

Since the drier may be operated at times with or without the wet paper web, both conditions must be examined. Accepting 15,000 lbs. per square inch as an allowable operating stress in a shell of cast iron having a strength of 60,000 p.s.i., the staying cylinder will produce a satisfactory result (referring to FIG. 7) if its radius is from about 55 to about 90 percent of the shell radius, the lower limit being determined by stresses induced by internal pressure alone, and the upper limit being determined by the combined stress under operating conditions, as shown in the graph of FIGURE 7. These limits may be shifted higher or lower, or the range broadened or narrowed by changes in certain of the design factors, as will be shown.

For example, FIGURE 7 also shows the effects of lengthening the drier shell while holding the other conditions constant. The curves of group B and group C represent, respectively, the stresses induced under the same operating conditions in otherwise identical driers having lengths or "face widths" of 180″ and 240″ respectively. These curves indicate that while lengthening the drier shell has but little effect upon the axial shell stresses induced by internal pressure and by radial shrinkage of the shell, it has a marked effect upon the stress occasioned by axial shrinkage. This is due to the fact that as the shell length increases, its absolute shrinkage in the axial direction also increases, inducing further bending of the head and therefore of the shell, thus increasing the bending stress. As shown in FIGURE 7, the lower limit of the optimum range of the radius $b$ of the staying cylinder is substantially unchanged as the length of the drier increases, but the upper limit of the optimum range is reduced at a face width of 240″ to approximately 80% of the shell radius to maintain an axial shell stress of 15,000 lbs. per square inch under operating conditions.

While the component of stress due solely to axial shrinkage is considerably higher than the combined stress at the upper end of the range, it has no separate significance since it cannot occur without its countermanding concomitant due to radial shrinkage.

The comparative curves of FIGURE 7 also clearly indicate that as the length or face width of the drier increases, the combined stresses under operating conditions are also considerably increased, but the optimum value for the staying cylinder radius $b$ is reduced, being approximately 62 or 63% of the shell radius of 72″ in a drier 240″ long.

The variation of the axial stress in the shell with changes in the value of the staying cylinder radius $b$, suggests that the axial stresses in the shell are influenced substantially by the degree of flexibility of the drier head, and that the magnitude of the bending stresses in the shell in the axial direction due to the bending of the head and to the expansion of the shell under pressure, or to the further bending of the head due to axial shrinkage of the shell, can be far greater than the hoop stress which serves as one of the Code criteria for determining safe operating conditions. It is therefore pertinent to examine the effects upon the shell stress of changes in those design constants which affect the flexibility of the drier head.

Figure 8:
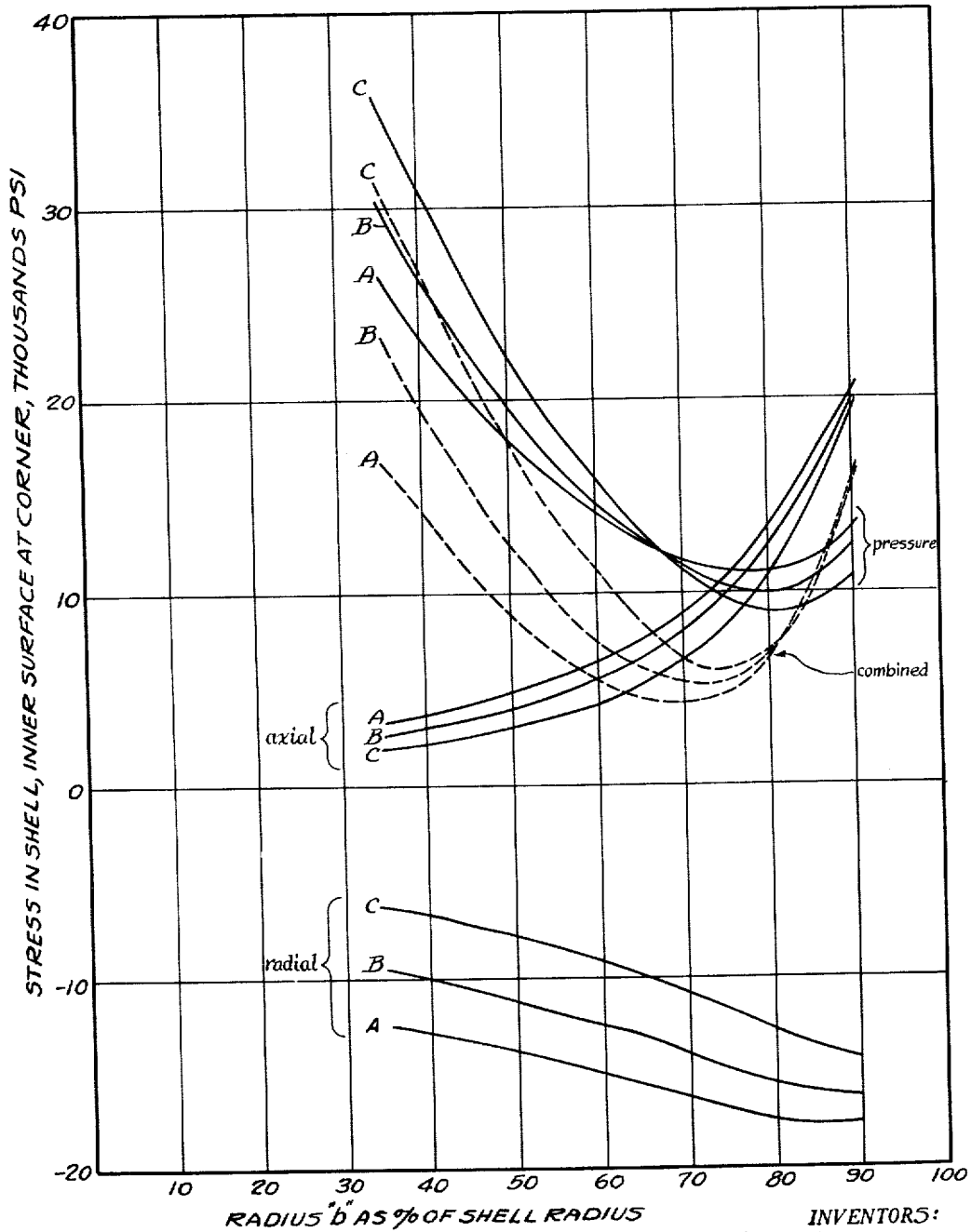

FIGURE 8 is a graph of a family of curves similar to those of FIGURE 7, but showing the effect upon the axial shell stress of changing the thickness of the drier head of a drier having a shell radius of 72″, shell thickness 1½″, length 140″, heated with wet steam at 125 p.s.i.g. In each case, the radius H of the inflexible hub portion of the head, as in the case of all of the graphs of FIGURE 7, was 20″. The curves of group A of FIGURE 8 are identical with those of group A of FIGURE 7.

The curves of groups B and C of FIGURE 8 show the combined axial stress and the components of that stress due to internal pressure and to axial and radial shrinkage of the shell for driers otherwise identical to the drier of the group A curves, but in which the thicknesses of the drier heads were 2½″ and 2″ respectively. This family of curves shows that as the head becomes thinner and therefore more flexible, the optimum value of the staying cylinder radius $b$ is raised, and the minimum combined stress is somewhat greater. The minimum stress due solely to internal pressure is somewhat reduced. Also while the limits of the acceptable range of the radius $b$ is more precisely defined as the head becomes thinner, in that the rate of change of stress with the value of the radius $b$ becomes greater, the acceptable range is changed very little, having a lower limit of about 60% and an upper limit of about 90% of the shell radius as the thickness of the drier head is reduced to 2″.

Figure 9:
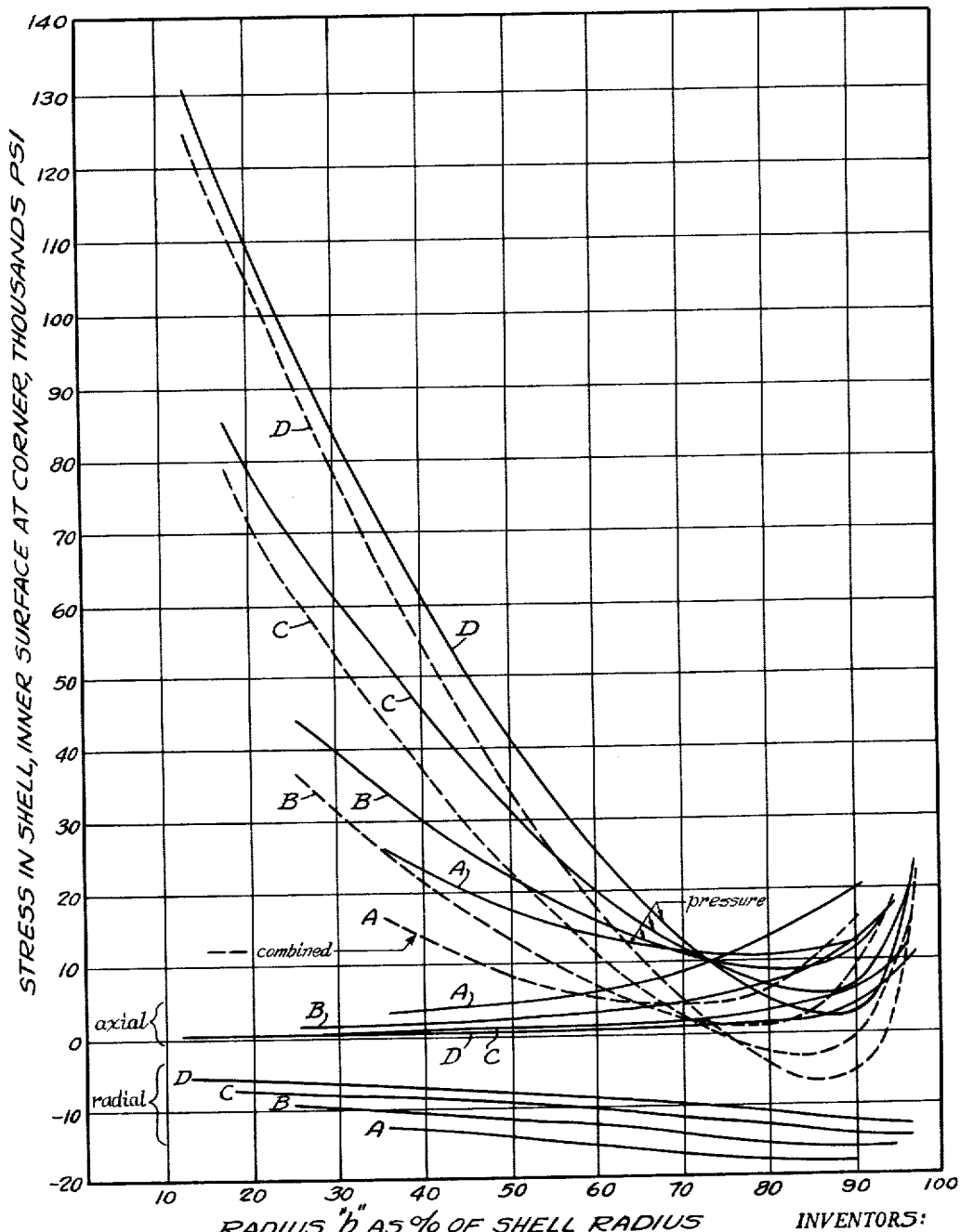

The effects of changing the radius of the drier are similar in kind to the effects produced by changing the thickness of the drier head. These are shown in FIGURE 9 which presents a family of curves similar to those of FIGURES 7 and 8, but in which the several groups of curves A, B, C, and D represent respectively the axial stresses at the inner surfaces of shells of driers of 72", 100", 150", and 200" in radius, the group A curves being the same as groups A of FIGURES 7 and 8 but plotted on a smaller scale. However, the internal pressures at which these stresses are produced are not the same in each case, but are those calculated to produce the maximum Code-allowable hoop stress of 10 percent of the ultimate strength of the material.

The structural material in each case is a high strength nodular cast iron having an ultimate strength of approximately 60,000 lbs. per square inch. Thus for a hoop stress of 6,000 lbs. per square inch, the maximum allowable steam pressures vary from 125 lbs. per square inch for a drier of radius 72", to a maximum allowable pressure of 45 lbs. per square inch in a drier of radius 200". In each case, the thickness of the drier shell is 1½". At these steam pressures, the temperature differentials between steam temperature and the average shell temperature under operating conditions vary from 84° F. at 125 p.s.i. to 54° F. at 45 p.s.i. with appropriate reduction of the shrinkage produced in the shells.

Notwithstanding these differences, the general effect of increasing the radius of the drier, and thus the radius of the drier head, is not unlike the effect of reducing the thickness of the drier head. Specifically, the components of the axial stress at the inside surface of the shell due to axial and radial shrinkage of the shell, are quite substantially reduced at greater shell radii, but their curves become flatter and have less control in determining the optimum location of the staying cylinder. The component of axial stress due to internal pressure, however, changes rapidly with changes in location of the staying cylinder, and while the minimum stress due solely to pressure becomes less as the radius of the drier is increased, the change of stress with change in the location of the staying cylinder is much more marked in the larger driers and narrows the optimum range of the staying cylinder radius $b$. Specifically, the acceptable range for the value of $b$ in a drier of 200" radius extends from about 70% to about 95% of the radius of the shell, best results being obtained when $b$ is slightly more than 85% of the shell radius. Outside of this range the stresses in the shell get rapidly out of hand.

VARIANTS OF THE PREFERRED FORM

The foregoing discussion may suggest that since the bending or bowing of the head due to internal pressure is one of the chief factors contributing to the significant shell stress, i.e., the axial stress which occurs in the shell at its connection to the drier head, this component of the significant stress can be reduced if not entirely eliminated if the bending of the head were eliminated, however this might be accomplished. For example, referring to the diagrammatic illustration of FIGURE 4, the radius H of the rigid hub of the drier head 40 might be increased, thereby decreasing the width of the remaining relatively thin outer portion of the head so as to render it less flexible. Conceivably this approach might be carried to the extreme of making the entire head rigid. Under conditions of internal pressure alone, such a solution would be workable, as will later be shown, but under actual operating conditions, wherein the shell is cooled and shrinks, the opposite bending moment introduced in the shell as a result of its radial contraction becomes prohibitive.

It has been discovered, nevertheless, that suitably low stresses at the critical location in the shell 38 (FIG. 2) can be obtained by extending the massive central hub portion of the head 40 outwardly to the range found best suited for the location of the staying cylinder in the preferred form of drier, and by merging the staying cylinder 52—48 with the central shaft 54 by providing a central shaft sufficiently massive to serve both functions. The result is the modification of FIGURE 5. This arrangement, in effect, applies inwardly directed staying forces to the flexible portion of the head at the proper location through the medium of the rigid central portion of the head, rather than by staying members and cylinder 52—48 used in the preferred form. As will be shown, however, the loss of flexibility of the head inwardly of the point of application of the staying forces alters the deflection pattern of the head and results in somewhat higher stresses in the shell. The minimum shell stress, however, occurs when the radius of the central hub portion H is approximately the same as that found most favorable for the staying cylinder in the preferred form.

The method of analysis previously outlined in connection with the preferred form illustrated diagrammatically in FIGURE 4 is equally applicable to the examination of the modified form in which the corrective influence upon the bending of the flexible portion of the drier head 40 is transferred from the staying cylinder 52—48 to the inflexible central hub portion of the head 40 as the radius H of the latter is increased. When the radius H becomes as great as the radius $b$ of the staying cylinder, the staying cylinder 52—48 no longer influences the bending of the outer flexible portion of the head, and, as it then contributes only a direct axial force to the rigid hub, it may, for practical purposes, be merged with the central shaft 42 in any manner found desirable. Stress analysis is thus considerably simplified inasmuch as the elimination of the staying cylinder 52—48 as such eliminates the bending moment $M_b$, and the axial force $R_b$ becomes merged in the axial force $R_c$ and therefore also eliminated. Moreover, the axial shear force in the drier head becomes uniform throughout its flexible portion, and the two regions of the head previously defined by the staying cylinder 52—48 become one, thus eliminating three of the constants of integration in the expression for the deflection of the head. The system thus reduces itself to one of seven unknowns.

Also referring to FIGURE 4 and to Table II, when the staying cylinder 52—48 is removed as such from the system, Equation numbers 3, 4, 8, 11 and 12, all of which relate to the effects of the presence of the staying cylinder, drop out, leaving a system of seven simultaneous equations in seven unknowns. These equations can be solved, as indicated before, for the determination of the moments and forces exerted on the shell as a result of internal pressure and as a result of the cooling of the shell under operating conditions.

Figure 10:
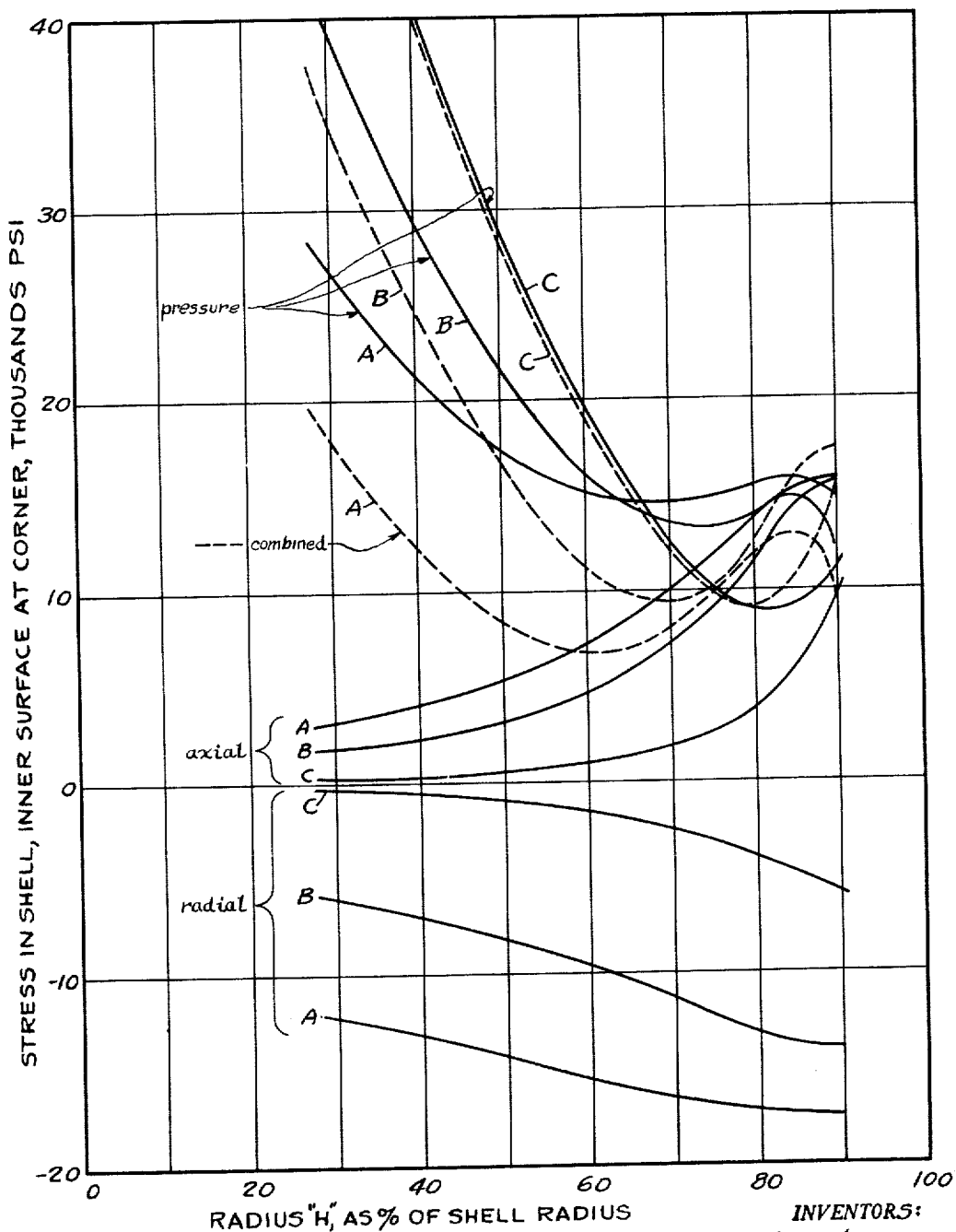
FIGURE 10 is a similar graph showing the variation of the stresses at the same location in the shell of the forms of drier shown in FIGURES 5 and 6.

Several solutions of these seven equations for a cast iron drier of the modified form of FIGURE 5, and having a length or face width of 140", a radius of 6 ft., a shell thickness of 1½", and in which the relatively thin, flexible portion of the head was 3" thick, are shown in the curves of group A of FIGURE 10 in which the stresses encountered in the shell at its inside surface under operating conditions with 125 p.s.i. steam pressure are plotted as the ordinate against the radius H of the rigid central hub portion as the abscissa. As in the case of FIGS. 7 to 9, the abscissa is expressed in terms of percent of the shell radius.

The curves of group A indicate that the stresses occurring in the shell under the effect of internal pressure alone are at a minimum when the radius H of the rigid hub is approximately 70% of the radius of the shell, and that under operating conditions, i.e., with a wet sheet applied to the drier, the stresses in the shell at its inside surface is reduced by about half. Moreover, the effect of the shrinkage of the shell is such as to reduce the optimum value of the radius H to about 62% of the shell radius for operating conditions.

By comparing the graphs of FIGURE 10 with those, for example, of FIGURE 8, it will be seen that the stress behavior in both the preferred form and the modified form is quite similar, but that the optimum value of the radius H in the modified form is slightly higher for both conditions of operation, i.e., with and without the wet sheet, than the optimum value of the radius $b$ of the staying cylinder in the preferred form. The difference, however, is slight, as is the difference in the actual shell stresses produced when the values of these radii in both forms are at the optimum. Taking a stress of 15,000 p.s.i. as the desired maximum, the acceptable range of H, for a head of 3″ thickness, is from about 60% to about 90% or more, comparable to the range indicated for a head of 3″ thickness in the preferred form, as shown by FIGS. 7 and 8.

Still referring to the group A curves of FIGURE 10, it will be noticed that the components of stress at the inside surface of the shell due both to internal pressure and to axial contraction of the shell, turn sharply downwardly when the radius H exceeds 85% of the shell radius, indicating that the combined stress at the inside surface under operating conditions changes from tensile to compressive as the radius H approaches the radius of the shell. However, as the radius H approaches the radius of the shell, the stresses in the shell at its outside surface change from compressive to tensile, and rapidly become excessive, as will subsequently be shown.

The curves of groups B, and C, of the family of curves of FIGURE 10 indicate respectively the effect upon stress in the shell at its inside surface of reducing the thickness of the thin, relatively flexible outer portion of the head successively in one inch steps from 3″ (group A) to 1″ (group C). Comparing the entire family of FIGURE 10 with the family of FIGURE 8, it will be seen that the effect of increasing the flexibility of the head is the same in both forms of the invention, the effect being to raise and narrow the range of the optimum value of H and $b$, and at the same time to increase the stresses in the shell at the critical location due to greater bending of the head in response to internal pressure.

Figure 11:
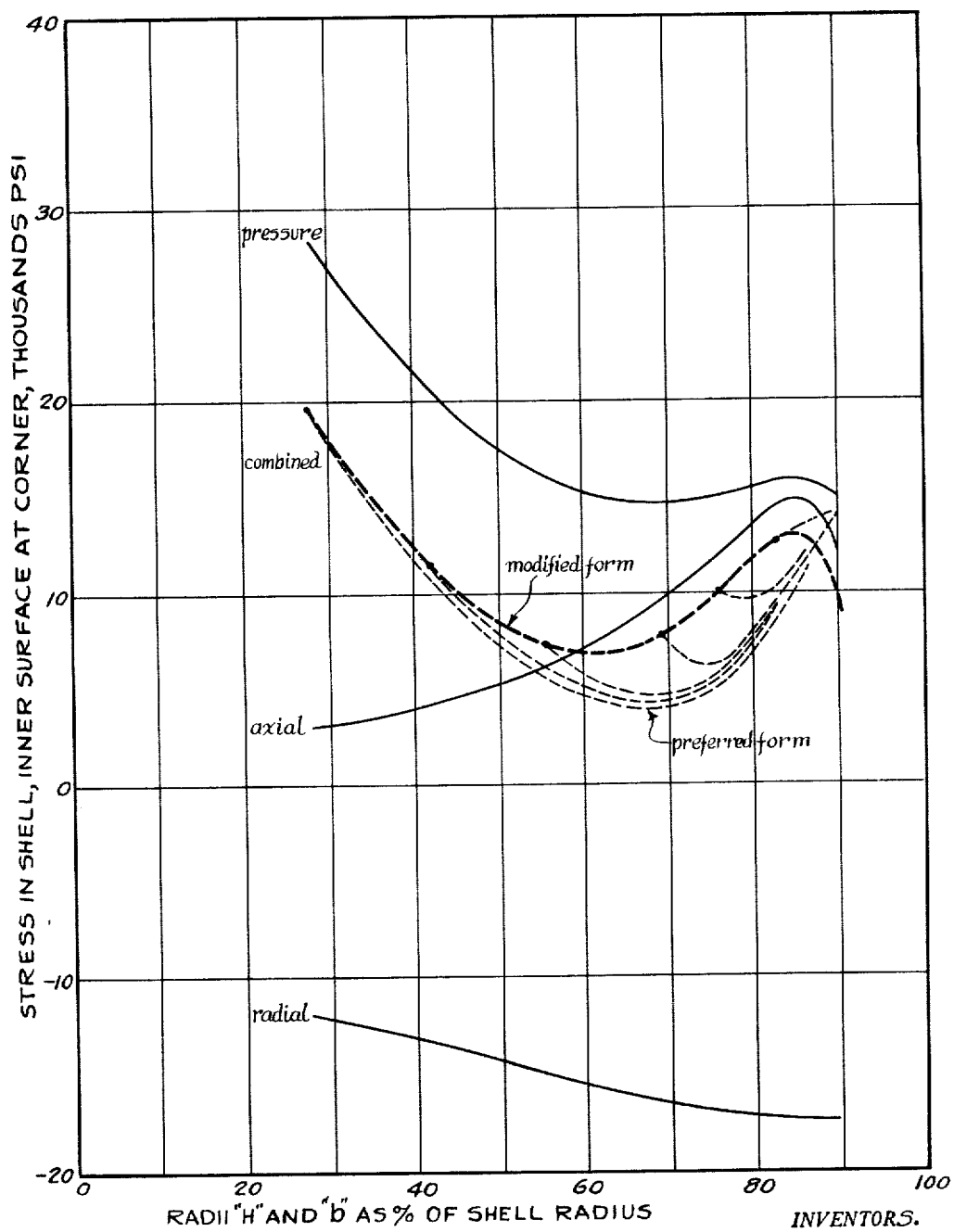
FIGURE 11 is a graph similar to FIGURE 10 and to FIGURE 7, comparing the preferred and modified forms of the invention as to the variation of shell stresses in each with variation of certain design factors.

A direct comparison of the two forms of the invention is made in FIGURE 11, which is a curve of the same type as those of FIGURES 7 to 10 inclusive, but which also shows the effect upon shell stress, and upon the optimum value of the radius $b$ of the staying cylinder of the preferred form, of increasing the radius H of the inflexible central hub of the drier head. The curves of FIGURE 11 apply to driers having the same overall dimensions as those of group A of FIGURES 7 to 10 inclusive, i.e., shell length or "face width" of 140″, shell radius 6 ft., shell thickness 1½″, thickness of the flexible portion of the head 3″, the stresses plotted in FIGURE 11 being those incurred at an internal steam pressure of 125 p.s.i.g. The solid line curves of FIGURE 11 show the variation of the three components of the axial stress in the drier shell at its inside surface in the absence of a staying cylinder and as the radius H of the rigid hub is varied. The uppermost broken line curve shows the combined stress under the same conditions. The depending broken line curves show the stress in the shells of driers of the preferred form having hub radii H fixed at the values from which the depending curves break away from the uppermost curve, and in which the radius $b$ of the staying cylinder is varied between the selected value of H and the radius of the shell. These curves show that the total axial stress under operating conditions can be substantially reduced in driers having a hub radius H as high as 70% of the shell radius by exerting additional staying forces through the medium of a staying cylinder or equivalent in accordance with the preferred form.

Figure 13:
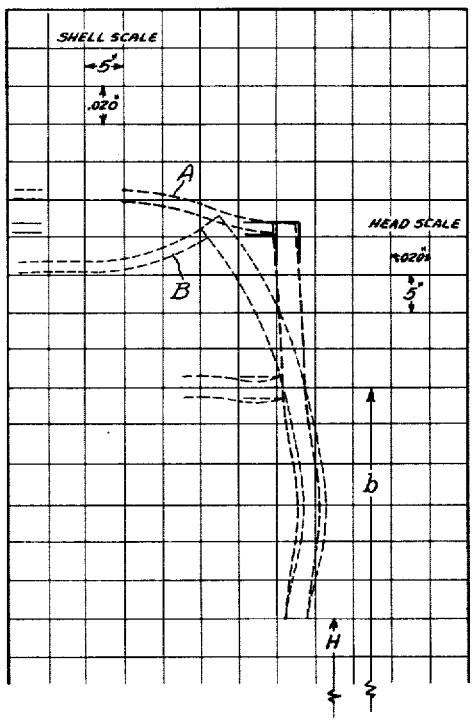
FIGURE 13 is a plot showing the deflections of the head and shell of the drier of FIGURE 1, showing the unstressed condition in full lines, the condition under steam pressure and temperature in broken lines at "A" and the condition under steam pressure and temperature, but with the shell cooled during operation, in broken lines at "B"
Figure 14:
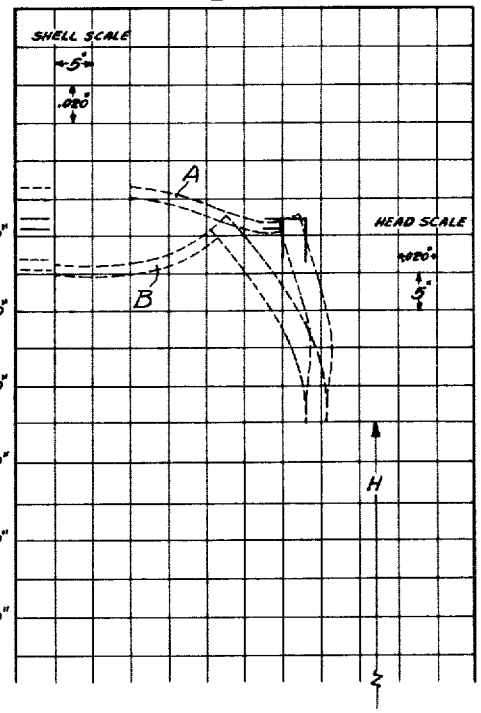
FIGURE 14 is a plot similar to FIGURE 13, but showing the deflections of the head and shell of the drier of FIGURE 5.
Figure 15:
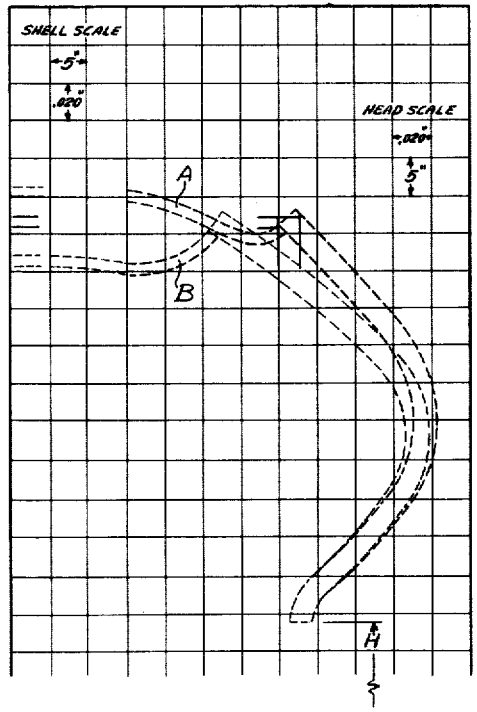
FIGURE 15 is a plot similar to FIGURE 13, but showing the deflections of the head and shell of the conventional drier of FIGURE 6.

A comparison of the preferred and modified forms of drier (FIGS. 1 and 5, respectively) with a drier of accepted commercial design, may be made from FIGURES 13, 14 and 15. FIGURE 13 shows the deflection of the head and shell of a cast iron drier in accordance with FIGURE 1, having a radius of 6 feet, shell thickness of 1½″ and head thickness of 3″. The physical dimensions of the head and shell are drawn to scale, the lower extremity of the head being the point of its attachment to the central shaft (bolt circle radius). The deflection of the shell is plotted for a distance of twenty inches inwardly of the head. For purposes of illustration, the deflections of head and shell are plotted accurately to an exaggerated common scale as indicated, the effect being to exaggerate the angle through which the outer rim of the head is rotated by the bending of the head and shell.

The condition shown in broken lines at A is the deflection pattern under steam pressure of 125 p.s.i.g. (temperature 353° F.), the solid line reference position being the location of the head-shell junction at a temperature of 353° F., but with no pressure difference between the inside and outside of the drier. It will be apparent that as the shell is expanded under pressure, and as the head is deflected by the internal pressure, the shell is bent in a reverse curve which warrants critical examination of the stresses, particularly at the inside surface of the shell, at the shell-head junction.

The condition shown in broken lines at B is the deflection pattern under steam pressure of 125 p.s.i.g., with only the shell cooled to a mean temperature of 269° F. by the application of the wet sheet. Under this condition, as already explained, the shell shrinks longitudinally and radially, exerting, as shown at B, a further bending of the drier head. The bending of the shell is relieved somewhat, however, as is apparent from the deflection pattern B, and reflected in a lower combined stress (FIG. 7, broken line curve A).

FIGURE 14 shows at A and B respectively the head and shell deflection patterns of a cast iron drier in accordance with FIGURE 5 for the sheet-off and sheet-on conditions under the same steam pressure and temperature as applied in the case of FIG. 13. Also as in FIG. 13, the radius of the drier is 6 feet, the head is 3″ thick and the shell 1½″ thick. Comparing FIGS. 13 and 14 it will be seen that the shell is slightly more bent in FIG. 14, under both conditions, than it is in FIG. 13, which is again borne out by comparison of the minimum stresses shown in the graphs of FIGS. 7 and 10, which also relate respectively to the driers of FIGS. 1 and 5.

FIGURE 15 shows at A and B the deflection patterns of a cast iron drier of conventional design under steam pressure of 125 p.s.i.g. for the sheet-off and sheet-on conditions, respectively. As in FIGS. 13 and 14, the drier has a radius of 6 feet, a head 3″ thick and a shell 1½″ thick. The head of the drier has about the same width as the drier of the preferred form of FIGS. 1 and 13, the inner periphery (bolt circle) having a radius of 19 inches. It will be apparent that the bending of the head of FIGURE 15 and the rotation of the rim of the head is much more pronounced than is the case with the heads of FIGS. 13 and 14. The bending of the shell is also consequently greater, as is clearly shown, with the result that the stresses in the shell are very high.

Referring to FIGURES 10 and 7, the shell stress under the pressure condition alone is approximately 30,000 p.s.i. for the drier of FIG. 15 (indicating probable failure under the Code-required test of 250 p.s.i. internal hydrostatic pressure) as compared with aproximately 15,000 p.s.i. for the drier of FIG. 14, and 12,000 p.s.i. for the preferred form of FIG. 13. The shell stress under the combined conditions, i.e., with cold sheet on the drier heated with steam at 125 p.s.i.g., is somewhat over 20,000 p.s.i. for the drier of FIG. 15, approximately 7,000 p.s.i. for the drier of FIG. 14, and 4,000 p.s.i. for the preferred form of FIG. 13.

FIGURES 13, 14 and 15 clearly illustrate that the turning of the joint between the drier shell and the drier head is much less in the driers in accordance with the invention than in the drier of conventional design, and illustrate graphically how it has been possible to reduce the thickness of the shell to values heretofore considered inherently unsafe. The curves further show the superiority of the preferred form in which the flexibility of the head radially inwardly of the point of application of the staying force results in less turning of the head at its joint with the shell.

The acceptable limits of $b$ in the preferred form and H in the modified form, in cast iron driers, are assembled from the foregoing into the three dimensional graph of FIGURE 12 which shows the permissible variation of $b$ or H, based upon an allowable shell stress of approximately 15,000 p.s.i., in driers which vary in length from 140 to 240 inches, in radius from 72 to 200 inches, and in which the thickness of the flexible portion of the drier head varies from 2" to 3".

The extent of permissible variation of $b$ or H is given by the projection to the X-axis of the intercept, by the solid figure, of the intersection of planes perpendicular to the Y and Z axes at the desired values of drier radius and drier length. The variation of the permissible range of $b$ or H with the thickness of the drier head is derived from a two-dimensional figure depending from the X axis in the X—Y plane. The latter shows the variation, with head thickness, of the permissible range of $b$ or H of a drier 140 inches long having a radius of 72 inches. The variations with head thickness, of the permissible range of $b$ or H in longer driers or driers having greater radii is given by curves drawn parallel to the limiting curves of the two-dimensional figure from the ends of the X-axis projection of their respective solid figure intercepts. Specifically, referring to FIG. 12 in the case of a cast iron drier 180" long and having a radius of 100" the range of values of $b$ or H as determined by the intercept F—G, is from 62% to 88% with a drier head 3" thick, but the range narrows to 65% to 88% at a head thickness of 2.5" and further to from 67% to 88% at a head thickness of 2.0".

RÉSUMÉ

The benefits of the invention may be readily appreciated from the table of FIGURE 16 which illustrates diagrammatically five forms of Yankee drier construction, and tabulates the stresses which occur on the inside and outside surfaces of the shells of each at the critical corner, under the effect of internal steam pressure of 125 p.s.i., with and without a wet sheet in contact with the drier surface, and also the stresses induced by internal hydrostatic pressure of 250 p.s.i., which a drier must withstand in order to be certified by the underwriters for operation with steam at 125 p.s.i. FIGURE 16A illustrates a drier of conventional design having a shell 140" long, 72" in radius and 2" thick, the head of the drier being 3 inches thick and having a rigid hub of radius 30" (at bolt circle). FIGURE 16B illustrates the same drier but with a shell 1½" thick. In the latter it will be noted that the reduction of the shell thickness from 2" to 1½" increased the axial tensile stress in the shell at its inside surface near the head from 31,000 to 48,400 p.s.i. under internal pressure of 250 p.s.i.

FIGURE 16C illustrates a drier of the same overall dimensions, but in accordance with the preferred form of the invention, having a shell 1½" thick, a hub radius (bolt circle radius) of 20", and with the staying cylinder having a radius $b$ of 50". The shell stresses in this case are less than one-half those induced in a conventional drier of the same size and thickness of shell (FIGURE 16B) under conditions of internal pressure alone, and are even more markedly reduced over the conventional design under actual operating conditions, i.e., under 125 lbs. per square inch steam pressure with the wet sheet in contact with the drier.

FIGURE 16D shows a drier of the same overall size, but in accordance with the modified form of the invention, in which the rigid hub portion of the drier head extends outwardly to a radius of 50" beyond which the head takes the form of a relatively thin ring 3" thick. This form also shows marked lowering of stress over the conventional design of drier although the stress behavior is not as favorable as in the preferred form shown in FIGURE 16C.

FIGURE 16E illustrates a drier in which the head is made substantially rigid throughout. Under conditions of internal pressure alone, the stresses in the shell are actually lower than those of either the conventional drier (FIG. 16B) or the drier in the modified form of the invention (FIG. 16D) and at least as favorable as the stresses produced under the same conditions in a drier of the preferred form (FIG. 16C). However, when the shell of such a drier is cooled under operating conditions, i.e., with the wet sheet applied, the shell contracts both axially and radially, the radial contraction being due both to the increased tension caused by the axial contraction (Poisson's law) and to the radial shrinkage occasioned by mere cooling. The head, not being cooled, maintains its size, and being substantially rigid, exerts a net bending moment in a direction opposite to the net bending moment experienced in driers of the other designs. The reversal of stress is quite drastic as shown by comparison of the four lower figures in the column of figures immediately beneath FIGURE 16E, which indicate that the stress on the inside of the shell at its junction with the head changes from 12,000 p.s.i. tension to 7,500 p.s.i. compression, and the stress at the outside surface of the shell at the same location changes from 7,625 p.s.i. compression to 27,500 p.s.i. tension when the wet sheet is applied to this drier heated by steam at 125 p.s.i.

As previously shown, this stress behavior can be radically improved by making a portion of the head adjacent the drier shell flexible, as in the modified form of the invention shown in FIGURE 16D, the most favorable results being obtained when the radius of the inflexible central portion of the head is within the range of 55 to 95 percent of the shell radius.

If the flexible portions of the heads of driers in accordance with the invention are so constructed as to have a modified flexibility behavior because of their material, shape or manner of construction, the optimum range of the value of the radius H or the radius $b$ may be raised or lowered depending upon whether the flexible portion of the head is more or less flexible, respectively, as indicated by the graphs of FIGURES 8, 9, and 10.

The foregoing discussion is based on specific examples of driers constructed of cast iron but it will be understood that the principles involved are equally applicable to driers constructed of other metals.

When designing a drier for a different metal or combination of metals, the formulae given earlier in this specification may be used with the proper values for elastic modulus, coefficient of thermal expansion and the like which apply to the metal chosen. It has been found that a large percentage change in the elastic modulus will affect the stresses by only a small percentage. Other factors being equal, the stresses produced by axial and radial contraction of the shell will be directly proportional to the coefficient of thermal expansion of the metal used. Thus, if brass were used with an expansion coefficient 1.7 times that of cast iron, the stresses due to axial and radial expansion in the brass drier would be 1.7 times as large as in the cast iron drier. The stresses due to pressure, which depend only slightly on the elastic modulus, would be relatively unaffected.

In the foregoing there has been described an improved construction of rotary pressure vessels of the type employed as contact driers which permit the use of much thinner drier shells than have heretofore been safe, with the result that much higher rates of heat transmission are attainable with the corresponding increases in drying capacity. In order to achieve these conditions, the head of a drier in accordance with the invention is stayed against axial deflection at a radius within the range of 55 to 95 percent of the radius of the shell. At least outwardly of a circle of such radius, the head must be flexible in order to maintain suitably low stresses under operating conditions, i.e., when the shell is cooled during the drying operation.

It has been further shown that the most favorable deflection pattern of the head is obtained when the drier head is also flexible inwardly of the circle at which the staying forces hold the head axially immobile, as in the preferred form of the invention, with further reduction of the critical stresses in the drier shell.

The foregoing illustrations and analysis of two forms of the invention show how the structural principles involved may be utilized for the production of further modifications and will serve to inform those skilled in the art of the scope of the present invention.

The features of the invention believed to be new and patentable are set forth in the appended claims.

We claim:
1. A Yankee drier or the like comprising a thin cylindrical shell, a relatively flat head of greater thickness than said shell secured thereto at each end thereof, a central shaft extending between and rigidly secured to said heads co-axially thereof and providing journals for rotatably supporting said drier, said heads and shell being flexible so as to be deformable under normal operating conditions, and staying means secured to and spanning said heads within said shell to direct the deformation of said heads, said staying means comprising a cylindrical member circumferentially secured to the inside face of each of said heads co-axially thereof and having a radius of from 55% to 95% of the radius of the shell, and a plurality of rods interconnecting said cylindrical members, said interconnecting rods being uniformly distributed about the axis of the drier, said staying means being substantially inextensible in response to forces exerted thereon by said heads during normal operating conditions.

2. A Yankee drier or the like comprising a cylindrical cast iron shell at least 10 feet long, and 10 feet in diameter and less than 2 inches thick, a relatively flat metal head in the form of a ring of about 3 inch thickness rigidly secured to said shell at each end thereof, a central shaft extending through said heads co-axially therewith and providing bearing means for rotatably supporting said drier, said heads being rigidly secured to said shaft, and a plurality of staying members secured to and extending between said heads to direct the deformation of said heads, said staying members being substantially inextensible in response to forces exerted thereon by said heads under normal operating conditions and being uniformly distributed about the axis of said drier and connected to said heads at a radius of from 55% to 95% of the radius of the drier shell.

3. A Yankee drier or the like comprising a thin cylindrical shell, a relatively flat head secured to said shell at each end thereof, bearing means on each of said heads for rotatably supporting said drier, said shell being deformable by the temperature and pressure differentials occurring between the inside and outside thereof under normal operating conditions and by the forces exerted thereon by said heads, said heads being also deformable by said pressure differential and by the reaction of said shell, staying means extending between said heads inside said drier at a radius $b$, said staying means being substantially inextensible by the forces exerted thereon by said heads, the radius and length of said shell, the thickness of said head, and said radius $b$, being within the limits defined by the diagram of FIGURE 12 hereof.

4. A Yankee drier or the like comprising a thin cylindrical shell, a relatively flat head secured to said shell at each end thereof and providing journals for rotatably supporting the cylinder, said heads being substantially rigid inwardly of a radius of from 55% to 95% of the radius of the shell, and flexible outwardly thereof in response to the pressures encountered in normal Yankee machine operation, and staying means spanning said heads within said shell and being secured to said rigid portions thereof, said staying means being substantially inextensible in response to axial forces exerted thereon by said heads and being uniformly disposed about the axis of the cylinder.

5. A Yankee drier or the like comprising a thin cylindrical shell, a concentric inner hollow cylindrical member closed at its ends by axially rigid heads providing journals for the drier with means therein for ingress and egress of the heating medium, said heads having a radius of from 55% to 95% of the radius of the shell, and a relatively flat head-ring rigidly secured to each head and to an end of the shell, said ring being flexibly deformable under normal operating conditions of the drier, said inner cylinder being substantially inextensible in the axial direction in response to forces exerted thereon by said heads.

6. A Yankee drier or the like comprising a thin cylindrical shell, a relatively flat head secured to said shell at each end thereof, bearing means on each of said heads for rotatably supporting said drier, said shell being deformable by the temperature and pressure differentials occurring between the inside and outside thereof under normal operating conditions and by the forces exerted thereon by said heads, said heads comprising an outer peripheral portion which is axially flexible in response to said pressure differential, and a rigid inner central portion, staying means interconnecting the rigid central portions of said heads, said staying means being substantially inextensible by the forces exerted thereon by said heads, the radius and length of said shell, the thickness of the flexible portions of said heads and the radius of the rigid portions of said heads, being within the limits defined by the diagram of FIGURE 12 hereof.

7. A drier drum comprising a cylindrical shell, a center shaft coaxial with the shell, head members on said shaft, flexible ring assemblies extending radially from said head members to said shell for simultaneously sealing and supporting the shell to retain steam pressure therein, said assemblies being capable of deflecting under load and preventing the transmission of stresses from the head members to the shell, and support members engaging said flexible assemblies intermediate the shell and head.

8. A drier drum comprising a cylindrical shell member, a center shaft coaxial with the shell, head members on said shaft, flexible ring assemblies extending radially from said head members to said shell for simultaneously sealing and supporting the shell to retain steam pressure therein, said assemblies being capable of deflecting under load and preventing the transmission of stresses from the head members to the shell, and rigid ring means engaging said flexible assemblies along a region spaced from said shell and said head members.

9. A drier drum adapted to have heated fluid under pressure supplied to it for heating the drum comprising a relatively flexible, cylindrical outer shell adapted to receive a web thereon for drying the web; a pair of heads secured to said outer shell on the ends thereof; a pair of shaft portions carried by said heads for rotatably supporting the drum; said heads each being provided with an integral, relatively rigid, generally axially extending inner shell portion located intermediate said outer shell and its axis and otherwise being relatively flexible; and staying means spanning said heads within said shell and being secured to said relatively rigid inner shell portions, said staying means being substantially inextensible in response to axial forces exerted thereon by said heads and being uniformly disposed about the axis of said outer shell for reducing stresses in said outer shell and heads in the regions of attachment of the heads and outer shell.

10. A drier drum adapted to have steam under pressure supplied to it for heating the drum comprising a relatively flexible cylindrical shell adapted to receive a web thereon for drying the web; a pair of heads secured to said shell on the ends thereof; a pair of shaft portions carried by said heads for rotatably supporting the drum; said heads each being provided with an integral, relatively rigid, cylindrical portion located on a radius of from 55 percent to 95 percent of the radius of said shell and the heads otherwise being relatively flexible; and staying means spanning said heads within said shell and being secured to said cylindrical head portions, said staying means being substantially inextensible in response to axial forces exerted thereon by said heads and being uniformly disposed about the axis of said shell for reducing stresses in said shell and heads in the regions of attachment of the heads and shell.

11. A drier drum adapted to have heated fluid under pressure supplied to it for heating the drum, comprising a relatively flexible cylindrical shell, a head secured to said shell at each end thereof sealing said ends and providing journals for rotatably supporting said drum, means for applying inwardly directed staying forces on said heads at a circle of radius of from 55 to 95 percent of the radius of said shell in reaction to the outward pressure of said fluid, said means including a rigidifying axially-deepening concentric reinforcement of each of said heads and tie means extending through said drum and rigidly interconnecting said reinforcements, said tie means being substantially inextensible in response to axial forces exerted thereon by said heads, and said heads being flexible in response to the pressure of said heated fluid at least in the region outwardly of said circle.

References Cited in the file of this patent

UNITED STATES PATENTS

| | | |
|---|---|---|
| 550,988 | Mandot | Dec. 10, 1895 |
| 1,715,677 | Ritchie | June 4, 1929 |
| 1,948,963 | Dukes | Feb. 27, 1934 |
| 2,166,245 | Goff et al. | July 18, 1939 |
| 2,328,321 | Berry | Aug. 31, 1943 |
| 2,563,692 | Ostertag | Aug. 7, 1951 |
| 2,685,139 | Schadler | Aug. 3, 1954 |
| 2,817,908 | Hornbostel | Dec. 31, 1957 |

UNITED STATES PATENT OFFICE
CERTIFICATE OF CORRECTION

Patent No. 3,099,543                        July 30, 1963

Homer E. Malmstrom et al.

It is hereby certified that error appears in the above numbered patent requiring correction and that the said Letters Patent should read as corrected below.

Column 8, line 33, for "radal" read -- radial --; column 9, line 19, and column 11, line 15, for "shaft 54", each occurrence, read -- shaft 42 --; column 13, equation (18), for that portion of the equation reading $r_a^2$ read $t_a^2$ column 16, lines 6 and 7, for "appreciatde" read -- appreciated --.

Signed and sealed this 9th day of June 1964.

(SEAL)
Attest:

ERNEST W. SWIDER
Attesting Officer

EDWARD J. BRENNER
Commissioner of Patents